US012807407B2

(12) United States Patent
Austrheim et al.

(10) Patent No.: US 12,807,407 B2
(45) Date of Patent: Nov. 24, 2026

(54) AUTOMATED STORAGE AND RETRIEVAL SYSTEM COMPRISING AN ACCESS STATION COMPARTMENT

(71) Applicant: Autostore Technology AS, Nedre Vats (NO)

(72) Inventors: Trond Austrheim, Etne (NO); Ivar Fjeldheim, Haugesund (NO); Magne Hatteland, Stavanger (NO); Simen Aarseth, Stavanger (NO); Øystein Gjerdevik, Skjold (NO)

(73) Assignee: AutoStore Technology AS, Nedre Vats (NO)

( * ) Notice: Subject to any disclaimer, the term of this patent is extended or adjusted under 35 U.S.C. 154(b) by 491 days.

(21) Appl. No.: 18/256,736

(22) PCT Filed: Dec. 21, 2021

(86) PCT No.: PCT/EP2021/087074

§ 371 (c)(1),
(2) Date: Jun. 9, 2023

(87) PCT Pub. No.: WO2022/136423

PCT Pub. Date: Jun. 30, 2022

(65) Prior Publication Data

US 2024/0025643 A1 Jan. 25, 2024

(30) Foreign Application Priority Data

Dec. 23, 2020 (NO) .................................... 20201433

(51) Int. Cl.
*B65G 1/04* (2006.01)

(52) U.S. Cl.
CPC .... *B65G 1/0464* (2013.01); *B65G 2201/0235* (2013.01)

(58) Field of Classification Search
CPC ..................................................... B65G 1/0464
(Continued)

(56) References Cited

U.S. PATENT DOCUMENTS 2,499,498 A * 3/1950 Hammond, Jr. ........ E04H 1/005 414/277
3,474,580 A * 10/1969 Smeeth .............. E04B 1/34807 52/79.12
(Continued)

FOREIGN PATENT DOCUMENTS

CN 110065751 A 7/2019
CN 111225863 A 6/2020
(Continued)

OTHER PUBLICATIONS

Li, Shiqi, Office Action in CN202180085914.0, mailed Jun. 27, 2025, 15 pages, The State Intellectual Property Office of the People's Republic of China, Beijing, China.
(Continued)

*Primary Examiner* — James Keenan
(74) *Attorney, Agent, or Firm* — Baker Botts L.L.P.

(57) ABSTRACT

An automated storage and retrieval system includes a framework structure. The framework structure includes upright members, a storage volume comprising columns provided between the members, and a rail system provided on top of the members. Storage containers are stackable in stacks within the columns. The automated storage and retrieval system includes an access station and container handing vehicles configured to move on the rail system. The framework structure includes an access station compartment. The access station compartment comprises an access module, wherein the access module is one single independent access module with a self-supporting frame provided with wheels. The one single independent access module with a self-
(Continued)

supporting frame is insertable into and retrievable out from the access station compartment.

10 Claims, 22 Drawing Sheets

(58) Field of Classification Search
USPC .................................................... 414/267, 12
See application file for complete search history.

(56) References Cited

U.S. PATENT DOCUMENTS

| | | | | |
|---|---|---|---|---|
| 5,474,411 | A * | 12/1995 | Schoenfeld ......... | E04B 1/34807 52/234 |
| 6,301,776 | B1 * | 10/2001 | Myung ................... | B23P 15/26 29/890.035 |
| 6,470,630 | B1 * | 10/2002 | Miyamoto .......... | E04B 1/34807 52/64 |
| 6,709,225 | B1 * | 3/2004 | Pitts .................. | H01L 21/67775 414/787 |
| 10,538,388 | B2 * | 1/2020 | Clarke .................. | E04B 2/7403 |
| 2011/0255940 | A1 * | 10/2011 | Wildfeuer ................ | B65G 1/04 414/807 |
| 2019/0375589 | A1 | 12/2019 | Gravelle et al. | |
| 2021/0188545 | A1 | 6/2021 | Hognaland | |

FOREIGN PATENT DOCUMENTS

| | | | |
|---|---|---|---|
| CN | 210680847 | U | 6/2020 |
| CN | 111361913 | A | 7/2020 |
| EP | 3520957 | A1 | 8/2019 |
| JP | S56108601 | A | 8/1981 |
| JP | H08198407 | A | 8/1996 |
| JP | 2011042498 | A | 3/2011 |
| NO | 317366 | B1 | 10/2004 |
| WO | 2014/075937 | A1 | 5/2014 |
| WO | 2014/090684 | A1 | 6/2014 |
| WO | 2015/193278 | A1 | 12/2015 |
| WO | 2017/121515 | A1 | 7/2017 |
| WO | 2017/211596 | A1 | 12/2017 |
| WO | 2017/211640 | A1 | 12/2017 |
| WO | 2018/146304 | A1 | 8/2018 |
| WO | 2018/195200 | A1 | 10/2018 |
| WO | 2018/233886 | A1 | 12/2018 |
| WO | 2019/206487 | A1 | 10/2019 |
| WO | 2019/206971 | A1 | 10/2019 |
| WO | 2020/074717 | A1 | 4/2020 |
| WO | 2020/094604 | A1 | 5/2020 |
| WO | 2020/200739 | A1 | 10/2020 |
| WO | 2020/210558 | A1 | 10/2020 |

OTHER PUBLICATIONS

International Search Report issued in PCT/EP2021/087074 on Apr. 19, 2022 (5 pages).
Written Opinion of the International Searching Authority issued in PCT/EP2021/087074 on Apr. 19, 2022 (9 pages).
International Preliminary Report on Patentability issued in PCT/EP2021/087074, mailed on Mar. 28, 2023 (17 pages).
Written Opinion of the International Preliminary Examining Authority issued in PCT/EP2021/087074, mailed on Dec. 19, 2022 (6 pages).
Norwegian Search Report issued in No. 20201433, mailed on Jul. 12, 2021 (2 pages).
Waldstein, Martin, Extended European Search Report for European patent application No. EP24218019.8, dated Apr. 4, 2025, 13 pages, published by the European Patent Office, Munich, Germany.
Le Huy Anh, Examination Report Notice for Vietnamese Patent Application No. 1-2023-03518, dated Mar. 28, 2025, 4 pages, pub. by the Intellectual Property Office of Vietnam, Hanoi, Vietnam.
Shiqi, Li, Office Action in Chinese patent application 202180085914.0, mailed Oct. 28, 2025, 14 pages, pub. by the State Intellectual Property Office of the People's Republic of China, Beijing, China.
Uchida, Hiroyuki, Office Action in Japanese patent application 2023537981, mailed Dec. 10, 2025, 12 pages, Japan Patent Office, Tokyo, Japan.
Waldstein, Martin, Office Action in EP24218019.8, mailed Mar. 16, 2026, 8 pages, European Patent Office, Munich, Germany.
Li, Shiqi, Office Action in Chinese patent application 202180085914.0, mailed Apr. 22, 2026, 22 pages, The State Intellectual Property Office of the People's Republic of China, Beijing, China.
Anonymous, Examining communication in Korean patent application 1020237024486, mailed Jun. 18m 2026, 12 pages, Korean Intellectual Property Office, Daejeon, Republic of Korea.
Uchida, Hiroyuki, Examining communication in Japanese patent application 2023537981, mailed Jun. 22, 2026, 5 pages, Japan Patent Office, Tokyo, Japan.

* cited by examiner

Step a)

Step b)

Step c) and d)

AUTOMATED STORAGE AND RETRIEVAL SYSTEM COMPRISING AN ACCESS STATION COMPARTMENT

FIELD OF THE INVENTION

The present invention relates to a an automated storage and retrieval system comprising a framework structure. The present invention also relates to a an automated storage and retrieval system according any one of the above claims. The present invention also relates to a method for installation and/or de-installation of an access station in an automated storage and retrieval system.

BACKGROUND AND PRIOR ART

FIG. 1 discloses a prior art automated storage and retrieval system 1 with a framework structure 100 and FIGS. 2, 3*a* and 3*b* disclose three different prior art container handling vehicles 201,301,401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301,401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301,401 in a first direction X across the top of the frame structure 100, and a second set of parallel rails 111 arranged perpendicular to the first set of rails 110 to guide movement of the container handling vehicles 201,301,401 in a second direction Y which is perpendicular to the first direction X. Containers 106 stored in the columns 105 are accessed by the container handling vehicles 201,301,401 through access openings 112 in the rail system 108. The container handling vehicles 201,301,401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supporting.

Each prior art container handling vehicle 201,301,401 comprises a vehicle body 201*a*,301*a*,401*a* and first and second sets of wheels 201*b*, 201*c*, 301*b*, 301*c*,401*b*,401*c* which enable the lateral movement of the container handling vehicles 201,301,401 in the X direction and in the Y direction, respectively. In FIGS. 2, 3*a* and 3*b* two wheels in each set are fully visible. The first set of wheels 201*b*,301*b*, 401*b* is arranged to engage with two adjacent rails of the first set 110 of rails, and the second set of wheels 201*c*,301*c*,401*c* is arranged to engage with two adjacent rails of the second set 111 of rails. At least one of the sets of wheels 201*b*, 201*c*, 301*b*,301*c*,401*b*,401*c* can be lifted and lowered, so that the first set of wheels 201*b*,301*b*,401*b* and/or the second set of wheels 201*c*,301*c*,401*c* can be engaged with the respective set of rails 110, 111 at any one time.

Each prior art container handling vehicle 201,301,401 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301,401 so that the position of the gripping/engaging devices with respect to the vehicle 201,301,401 can be adjusted in a third direction Z which is orthogonal to the first direction X and the second direction Y. Parts of the gripping device of the container handling vehicles 301,401 are shown in FIGS. 3*a* and 3*b* indicated with reference number 304,404. The gripping device of the container handling device 201 is located within the vehicle body 201*a* in FIG. 2 and is thus not shown.

Conventionally, and also for the purpose of this application, Z=1 identifies the uppermost layer available for storage containers below the rails 110,111, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=6. The container handling vehicles 201,301,401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301,401 comprises a storage compartment or space for receiving and stowing a storage container 106 when transporting the storage container 106 across the rail system 108. The storage space may comprise a cavity arranged internally within the vehicle body 201*a*,401*a* as shown in FIGS. 2 and 3*b* and as described in e.g. WO2015/193278A1 and WO2019/206487A1, the contents of which are incorporated herein by reference.

FIG. 3*a* shows an alternative configuration of a container handling vehicle 301 with a cantilever construction. Such a vehicle is described in detail in e.g. NO317366, the contents of which are also incorporated herein by reference.

The cavity container handling vehicle 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIGS. 1 and 3*b*, e.g. as is disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail 110,111 may comprise two parallel tracks. In other rail systems 108, each rail in one direction (e.g. an X direction) may comprise one track and each rail in the other, perpendicular direction (e.g. a Y direction) may comprise two tracks. Each rail 110,111 may also comprise two track members that are fastened together, each track member providing one of a pair of tracks provided by each rail.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301,401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction that is horizontal, tilted and/or vertical. For example, the storage containers 106 may be placed in a random or dedicated column 105 within the framework structure 100, then picked up by any container handling vehicle and transported to a port column 119,120 for further transportation to an access station. The transportation from the port to the access station may require movement along various different directions, by means such as delivery vehicles, trolleys or other transportation lines. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301,401 can drop off storage containers 106 to be transported to an access or a transfer station, and the second port column 120 may be a dedicated pick-up port column where the container handling vehicles 201,301,401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301,401 is instructed to retrieve the target storage container 106 from its position and transport it to the drop-off port column 119. This operation involves moving the container handling vehicle 201,301,401 to a location above the storage column 105 in which the target storage container 106 is positioned, retrieving the storage container 106 from the storage column 105 using the container handling vehicle's 201,301,401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301,401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301,401 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301,401 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106, and the movement of the container handling vehicles 201,301,401 so that a desired storage container 106 can be delivered to the desired location at the desired time without the container handling vehicles 201,301,401 colliding with each other, the automated storage and retrieval system 1 comprises a control system 500 which typically is computerized and which typically comprises a database for keeping track of the storage containers 106.

An access station for picking storage containers is disclosed in WO2020/074717. This access station comprises an entry conveyor and an exit conveyor. Given the presence of both an entry and exit conveyor, the access station therefore has a footprint exceeding the width/length of a storage column. As such, where two access stations are situated adjacent to one another, there will therefore be some distance between the picking zone of two adjacent access stations.

The access station disclosed in WO2020/074717 also has many moving or rotating components, particularly associated with the conveyors, that are prone to wear and regularly require maintenance.

An objective of the present invention is therefore to provide a more compact access station where picking zones of adjacent access stations can be arranged closer to each other.

A further objective of the present invention is to reduce the complexity of the access station, particularly regarding the number of moving components.

SUMMARY OF THE INVENTION

The present invention relates to a an automated storage and retrieval system comprising a framework structure, wherein the framework structure comprises:

upright members;

a storage volume comprising columns provided between the members, wherein storage containers are stackable in stacks within the columns; and a rail system provided on top of the members;

wherein the automated storage and retrieval system comprises:

an access station; and container handing vehicles configured to move on the rail system;

characterized in that:

the framework structure comprises an access station compartment;

the access station is insertable into and retrievable out from the access station compartment.

In one aspect, the framework structure comprises outer panels secured between at least some of the peripherical upright members and wherein the access station is insertable into and retrievable out from the access station compartment via a side opening in one of the panels.

The present invention also relates to a an automated storage and retrieval system according any one of the above claims, wherein the access station compartment has a width being larger than a distance between two upright members, wherein the width is measured in a direction coinciding with or in a direction parallel with the distance.

In one aspect, the width and the distance are measured perpendicular to the direction of horizontal movement of the storage container in the access station.

In one aspect, the framework structure comprises a receptacle frame defining the access station compartment, wherein the receptacle frame is forming a support for a plurality of upright members.

In one aspect, the receptacle frame comprises upright frame members and cross-members connected between the upright frame members.

In one aspect, the width of the access station compartment is measured as the distance between two upright frame members.

In one aspect, the access station compartment is located in the periphery of the framework structure.

In one aspect, the access station is situated in the access station compartment during operation of the access station.

In one aspect, the access station is situated outside of the access station compartment during maintenance, repair and/or service of the access station.

In one aspect, the access station is forming one single modular unit. Alternatively, the access station is forming a few modular units. Hence, the operation of inserting the access station into the access station compartment and the operation of retrieving the access station from the access station compartment can be relatively efficient.

In one aspect, the access station comprises an access module comprising a frame, wherein the access station comprises wheels secured to the frame for rolling the access station into and out from the access station compartment via the side opening.

In one aspect, the access station comprises two, three or four wheels. In one aspect, the wheels are in the form of rollers. In one aspect, the wheels are castor wheels, e.g., each provided at a lower end of a vertically extending mount. The castor wheels may be a rigid type of castor wheel or a swivel type of castor wheel.

In one aspect, the framework structure comprises a support plate situated within the access station compartment and secured between a plurality of the upright members, wherein the wheels of the access station are supported on the support plate when inserted into the access station compartment.

In one aspect, the support plate may ensure, or at least contribute to, a correct alignment of the access station within the access station compartment.

In one aspect, the access station comprises:

a main module secured to the outside of the framework structure, wherein the main module is configured to receive the storage container;

a cover module for controlling access to the storage container when received by the main module;

a conveyor module for transporting the storage container between the main module and one of the columns;

wherein the conveyor module is insertable into and retrievable out from the access station compartment.

According to the above, the access station comprises three modules.

In one aspect, the main module is surrounding the side opening. Hence, the only way to access a storage container received within the main module is through the top cover. In one aspect, the main module is secured to the panel and/or to upright members of the framework structure. In one aspect, the main module is a wall hanging module. Alternatively, the main module is a floor standing module comprising for example legs or another type of base structure. In one aspect, the main module is a furniture-like structure, such as a cabinet.

In one aspect, the access station comprises a top opening alignable below one of the columns when the access station is inserted into the access station compartment, wherein at least one of the container handling vehicles is configured to supply a storage container to the access station through the column and/or to retrieve a storage container from the access station through the column when the access station is inserted into the access station compartment and aligned with the column.

In one aspect, the framework structure comprises horizontal members connected between the upright members at a height that permits the access station to be inserted into the access station compartment underneath the horizontal members.

In one aspect, the access station comprises a jack for elevating an upper portion of the access station upwardly within the access station compartment.

In one aspect, access station compartment comprises a roof portion. The roof portion may be formed by downwardly facing surfaces of the horizontal members. In one aspect, the top opening is located between horizontal members. The jack may be configured to elevate the access station up towards the roof portion within the access station compartment once inserted therein.

In one aspect, the frame is defining a drawer compartment provided within the frame;

wherein the access station comprises:

a drawer comprising a drawer base and a drawer front; wherein the drawer is movably connected to the frame;

a first actuator for moving the drawer relative to the frame between a presentation position in which the drawer is protruding from the drawer compartment and a retracted position in which the drawer is retracted within the drawer compartment;

wherein the drawer is protruding from the access station compartment in the presentation position and wherein the drawer is retracted within the access station compartment in the retracted position.

In one aspect, the access station comprises a front opening through which the drawer moves between the presentation position and retracted position, wherein the front opening is alignable with a side opening of the access station compartment in the framework structure.

In one aspect, the drawer front is aligned with the front opening when the drawer is in the retracted position.

In one aspect, the frame comprises vertical side guiding plates for guiding the drawer as it extends out to the presentation position and as it retracts to the retracted position.

In one aspect, the vertical side guiding plates are a snug fit to the drawer front to reduce gaps therebetween and thereby a possible risk of crushing fingers/hands during movement of the drawer. In one aspect, a resilient material is positioned between the vertical side guiding plates and the drawer front to reduce gaps and risks further.

In one aspect, the frame comprises a horizontal lower guiding plate for guiding the drawer. This lower guiding plate may be a snug fit to the drawer front to reduce gaps therebetween and thereby a possible risk of crushing fingers/hands during movement of the drawer.

In one aspect, the drawer base comprises a support on which a storage container can be supported in a front position or in a rear position.

In one aspect, the access station comprises a second actuator for moving a storage container from the front position to the rear position;

wherein the storage container is presented to a picker when the storage container is in the front position and when the drawer is in the presentation position.

In one aspect, the access station comprises a control system.

The control system may be configured to control the first and second actuators based on input from a user interface system and a safety mechanism.

The control system may be configured to control the cover module and the conveyor module based on input from the user interface system and a safety mechanism.

In one aspect, the user interface system and/or the safety mechanism may be provided outside of the access station compartment when the access station is inserted into the access station compartment.

In one aspect, the control system is secured to the frame. In one aspect, the control system is provided in communication with a control system for the automated storage and retrieval system.

In one aspect, the vertical side guiding plates and the horizontal lower guiding plate may extend/protrude from the access station compartment when the access station is inserted into the access station compartment.

In one aspect, a storage container retrievable from the drawer via the top opening and/or the drawer can receive a storage container via the top opening.

In one aspect, the front position is located below the top opening when the drawer is in the retracted position and wherein the rear position is located below the top opening when the drawer is in the presentation position.

In one aspect, the access station is configured to:

receive a storage container in the front position via the top opening when the drawer is in the retracted position;

allow a storage container to be retrieved from the rear position via the top opening when the drawer is in the presentation position.

In one aspect, the second actuator is configured to move the storage container from the front position to the rear position when the drawer is in the retracted position or when the drawer is moving from the presentation position to the retracted position.

In one aspect, the frame comprises a guard defining an upper border of the front opening.

In one aspect, the safety mechanism is configured to prevent an object from being squeezed between the drawer front and the guard during movement of the drawer from the presentation position to the retracted position.

In one aspect, the safety mechanism comprises:

a flap element provided adjacent to, and on a front side of, the guard;

a sensor for sensing movement of the flap element relative to the guard.

In one aspect, the flap element is movably connected to a flap holding structure secured to the frame.

In one aspect, the flap holding structure is a supporting structure for a user interface system.

In one aspect, the support comprises rollers for supporting the storage container in the rear position.

In one aspect, the support comprises a weight sensor for measuring a weight of the storage container when supporting the storage container in the front position.

In one aspect, the second actuator comprises an electric motor and an actuating element movable by means of the electric motor.

In one aspect, the drawer front and the guard are vertically aligned when the drawer is in the retracted position.

In one aspect, the drawer comprises a container stop for preventing movement of the storage container from the front position towards the rear position when the drawer is in the presentation position.

In one aspect, other parts of the framework structure comprises horizontal members. In one aspect, such horizontal members are integrated with the rail system.

According to the above, it is a achieved system in which a first access station may be replaced with a second access station in a simple and efficient way, in case the first access station needs repair, maintenance or service.

According to the above, it is achieved a system where the number of ports may be increased in an easy and cost-efficient way. In an initial phase, the system may comprise an initial number of access stations and an initial number of container handling vehicles. In a later phase, the capacity of the system may be increased by providing the side opening for the access station compartment in the panel and then inserting the access station. Before installation of the access station 10, the columns of the access station compartment may be used for stacking storage containers. Container handling vehicles may or may not be added as well.

In one aspect, the access station compartment is located below at least one column of the framework structure. The column may be a port column, i.e. which are not intended for a stack of storage containers, or a storage column which are intended for a stack of storage containers.

As used herein, the term "access station" is a station enabling access to a storage container. The station is typically enabling access for an operator to the storage container, but may also enabling access for a robot, for example a picking robot, to the storage container. The access station may typically be a picking or a stocking station where product items are removed from or positioned into the storage container. In a picking or a stocking station, the storage containers are normally not removed from the automated storage and retrieval system, but are returned into the framework structure again once accessed.

The present invention also relates to a method for installation and/or de-installation of an access station in an automated storage and retrieval system, wherein the method comprises the following steps:

- inserting the access station into an access station compartment of a framework structure and/or retrieving the access station out from the access station compartment of the framework structure.

In one aspect, the step of inserting the access station comprises:

- wheeling the access station into the access station compartment;
- lifting an upper portion of the access station into engagement with the access station compartment or the framework structure.

In one aspect, the step of retrieving the access station comprises:

- wheeling the access station out from the access station compartment;
- lifting an upper portion of the access station into engagement with the access station compartment or the framework structure.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
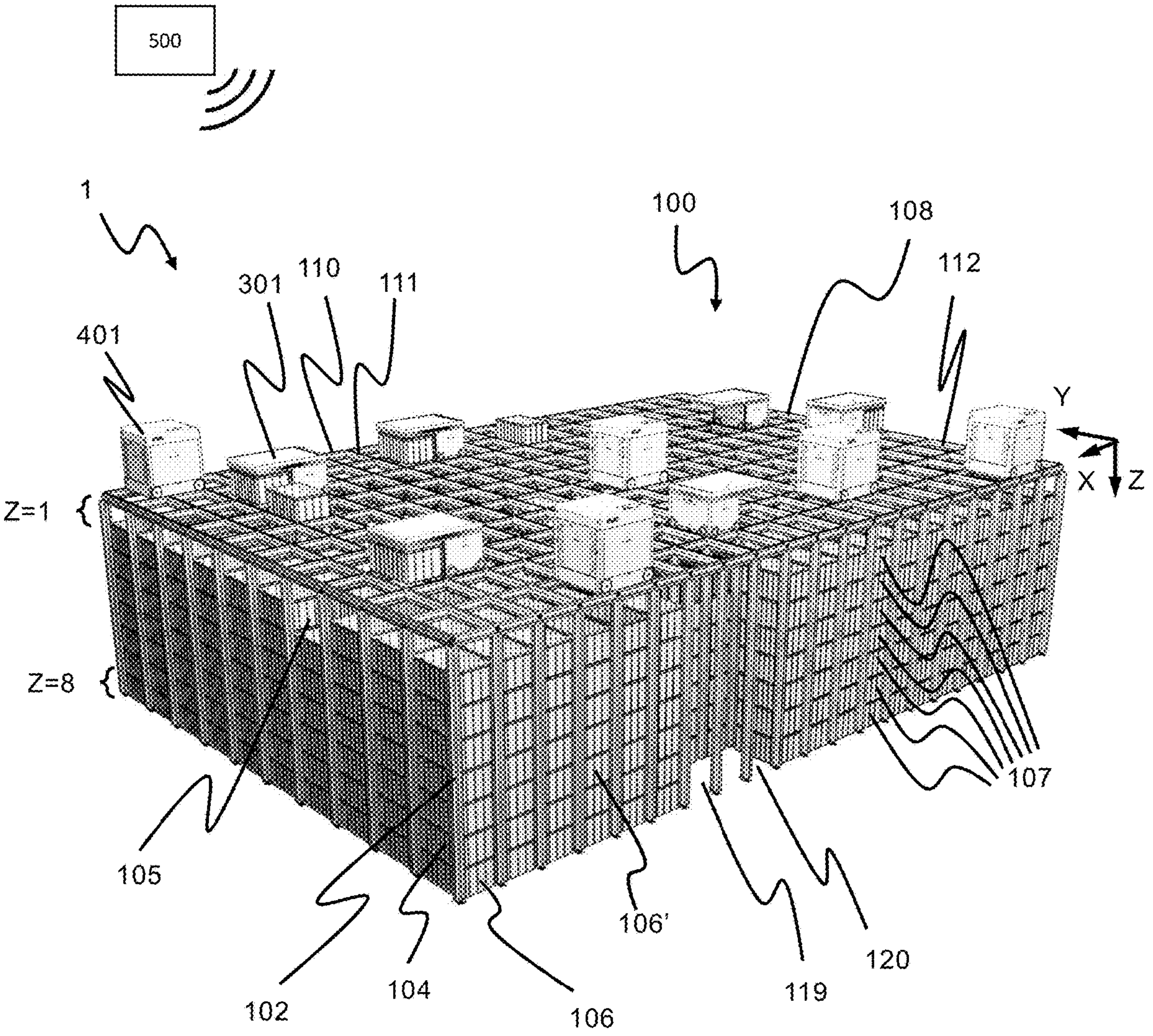
Fig. 1 (Prior Art)
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
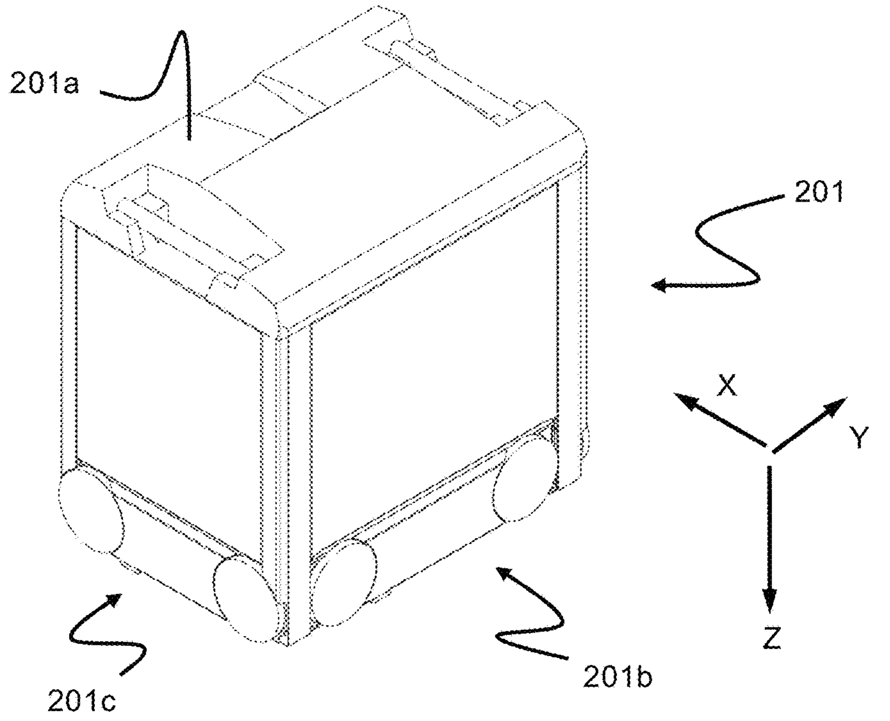
Fig. 2 (Prior Art)
FIG. 2 is a perspective view of a prior art container handling vehicle having an internally arranged cavity for carrying storage containers therein.
Figure 3A:
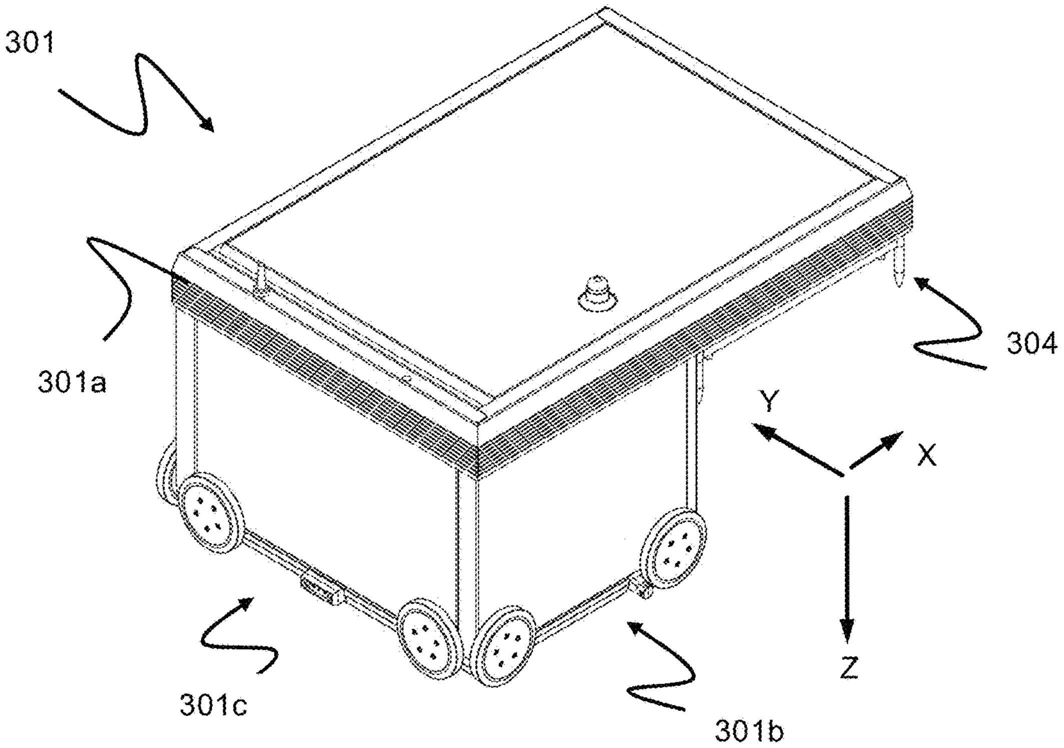
Fig. 3a (Prior Art)
FIG. 3*a* is a perspective view of a prior art container handling vehicle having a cantilever for carrying storage containers underneath.
Figure 3B:
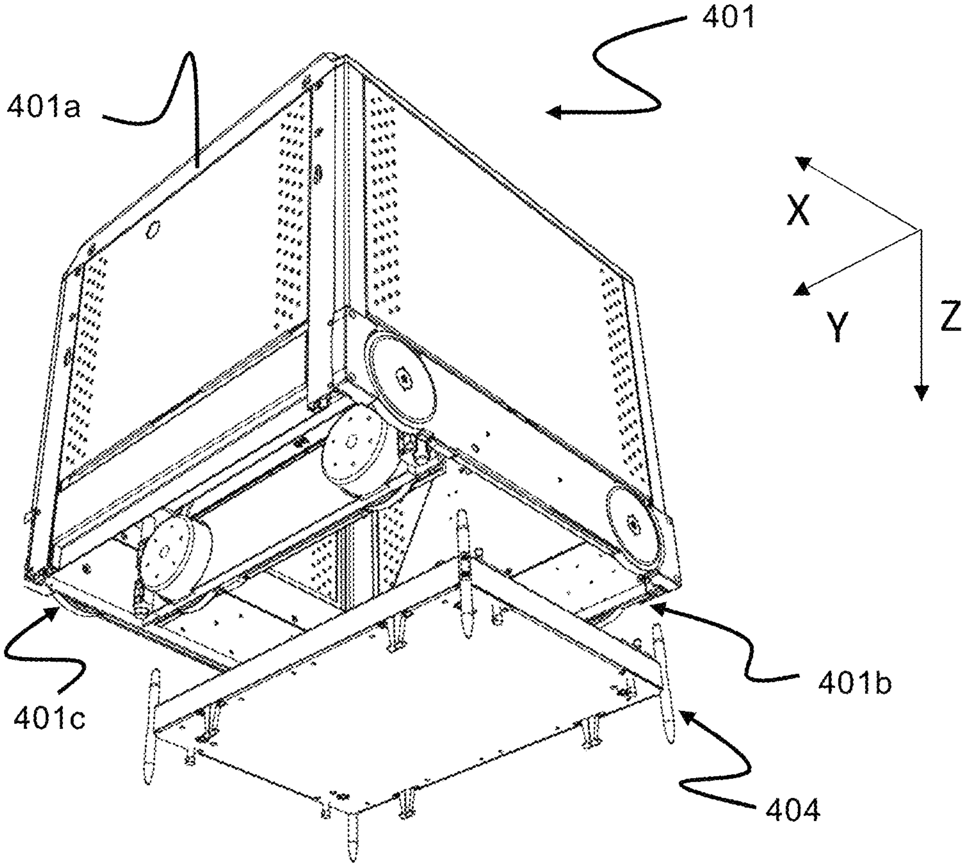
Fig. 3b (Prior Art)
FIG. 3*b* is a perspective view, seen from below, of a prior art container handling vehicle having an internally arranged cavity for carrying storage containers therein.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 4:
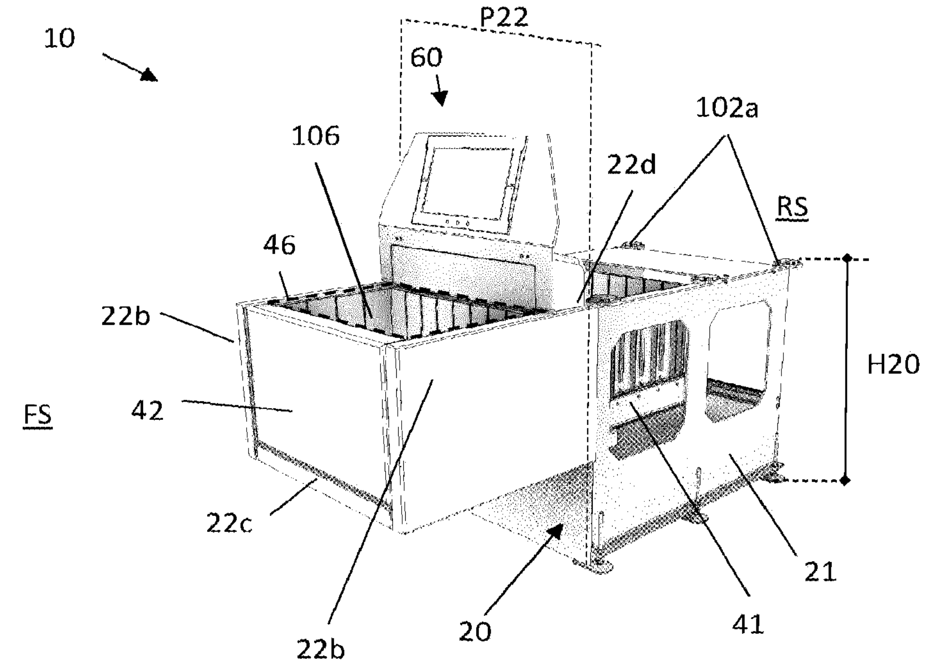
FIG. 4 is a front perspective view of an embodiment of an access station containing two storage containers.
Figure 5:
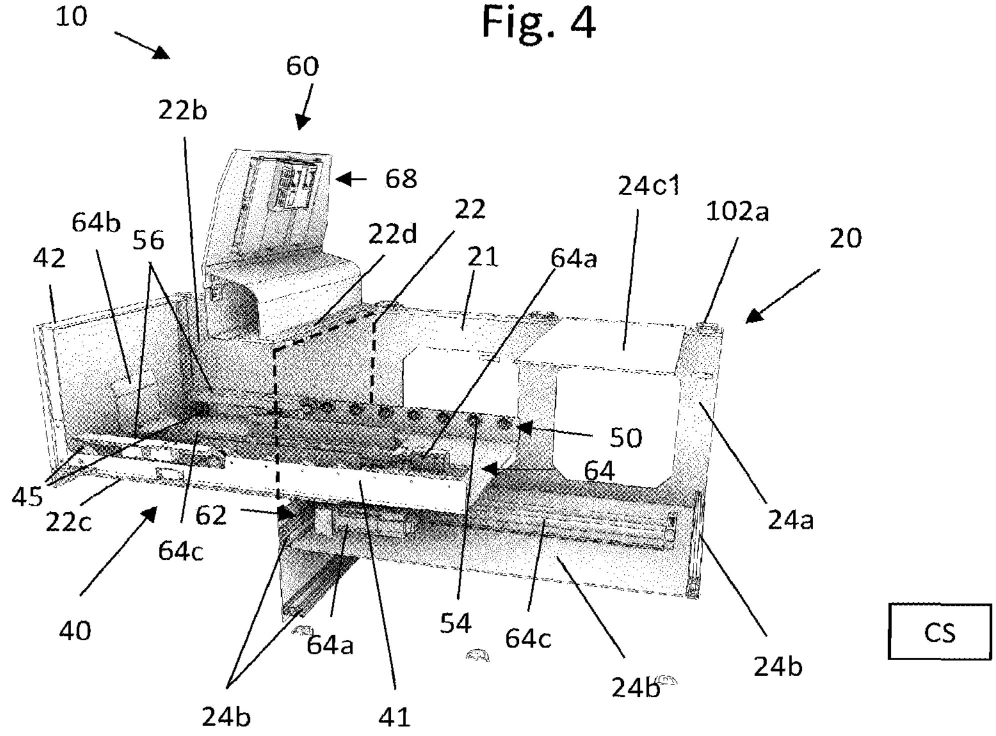
FIG. 5 is a rear perspective view of the access station of FIG. 4, where parts of the frame has been removed and where the access station does not contain any storage containers.

It is now referred to FIGS. 4 and 5, where an access station 10 is shown. The access station allows a storage container 106 from an automated storage and retrieval system 1 to be presented to a picker P (the picker P being shown in FIG. 11). The access station 10 may also be referred to as a port.

The access station 10 comprises an access module 20 comprising a frame 21 defining a drawer compartment 25 provided within the frame 21. The drawer compartment 25 is also indicated as a dashed box 25 in FIG. 7*b*.

The access station 10 further comprises a drawer 40 movably connected to the frame 21.

Figure 7A:
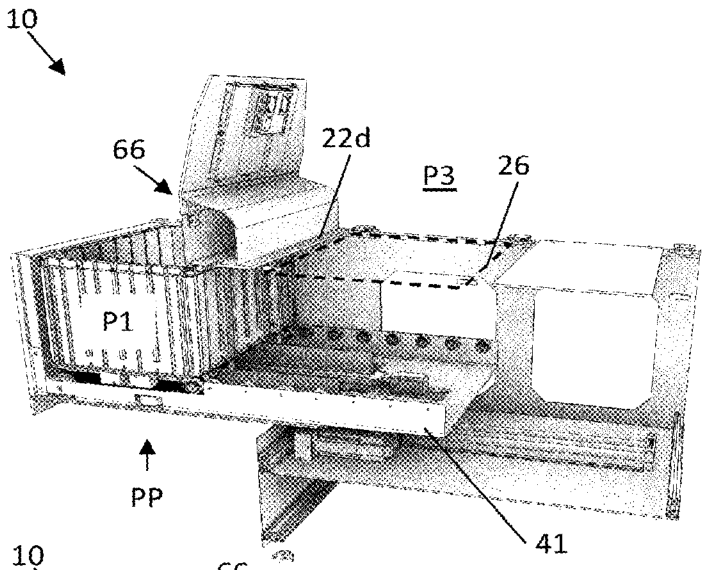
FIG. 7*a-d* show the operation of the access station of FIG. 4.
Figure 7B:
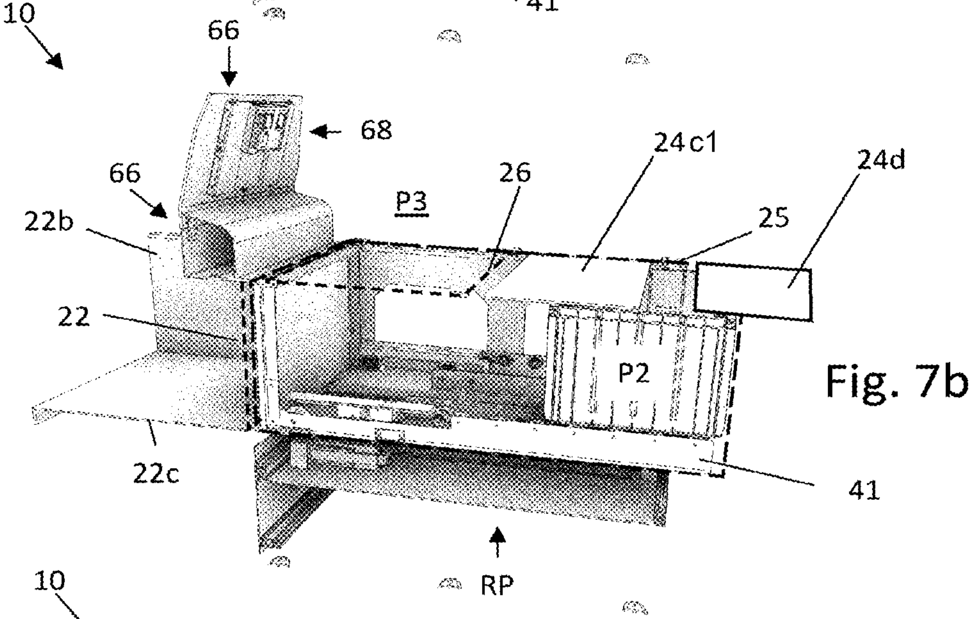

In FIG. 5 and FIG. 7*b*, it is further shown that the access station 10 comprises a front opening indicated as a dashed rectangle 22. The front opening 22 is typically oriented in a vertical plane P22 shown in FIG. 4.

It is further shown in FIG. 7*b* that the access station 10 comprises a top opening indicated as a dashed rectangle 26. The top opening 26 is provided in a horizontal plane.

It is also shown in FIG. 4 that the access station 10 comprises an access opening 46 through which the content of the storage container 106 is accessible for the picker P.

Figure 7C:
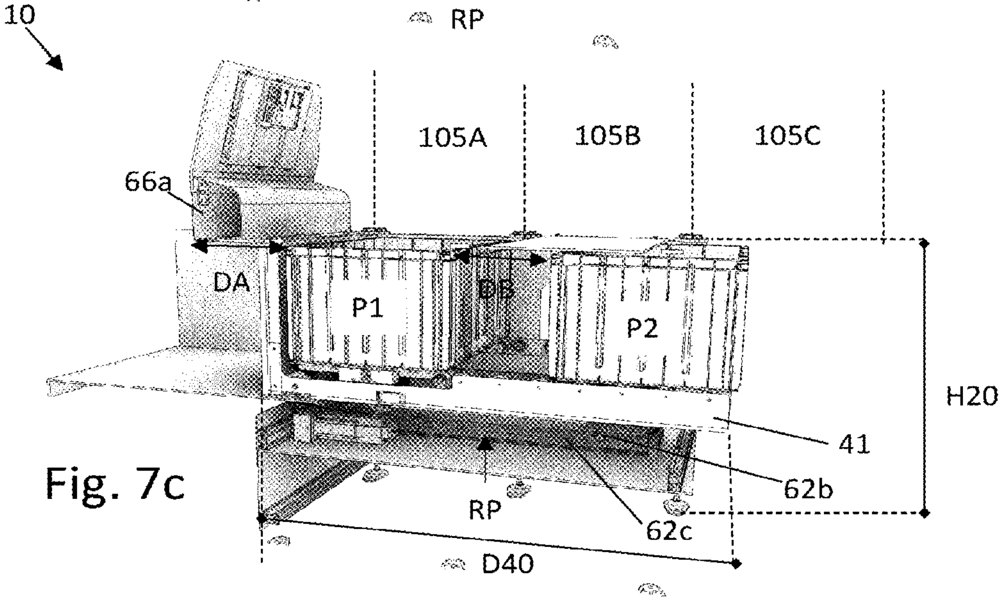

The access station 10 further comprises a first actuator 62 for moving the drawer 40 relative to the frame 21 between two positions referred to as a presentation position PP and a retracted position RP. The presentation position PP is shown in FIGS. 5 and 7*a*. Here, the drawer 40 is protruding from the drawer compartment 25 and a storage container 106 is presented to a picker P. The retracted position RP is shown in FIGS. 7*b* and 7*c*. Here, the drawer 40 is retracted within the drawer compartment 25 and hence, no storage container 106 is presented to the picker P.

The access station 10 further comprises a second actuator 64. The second actuator 64 and other details of the access station 10 will be described in detail below.

The access station 10 may also comprise a control system CS for controlling the first and second actuators 62, 64. The control system CS may be a part of the control system 500 for the automated storage and retrieval system, or the control system CS may be a separate control system in communication with the control system 500 for the automated storage and retrieval system.

Drawer 40

Figure 7D:
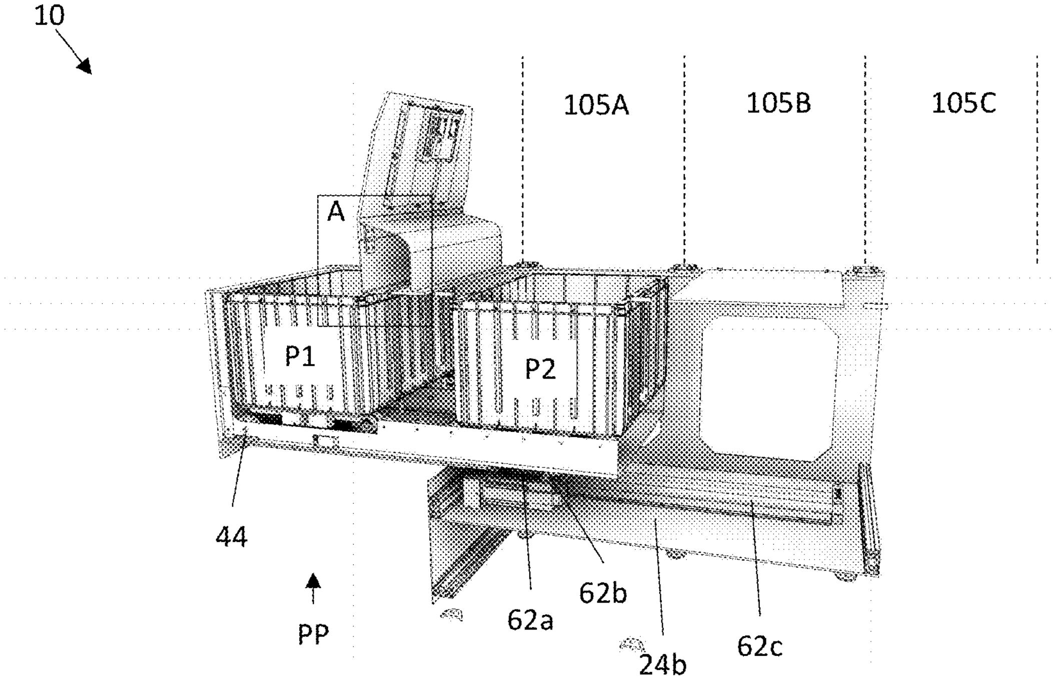
Figure 8:
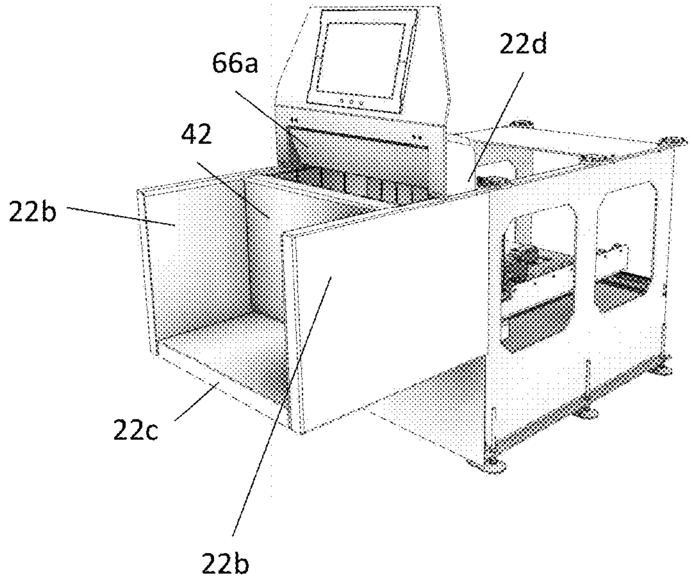
FIG. 8 is a front perspective view of the access station of FIG. 4 where the drawer is moved from the presentation position to the retracted position.

The drawer 40 comprises a drawer base 41 movably connected to the frame 21 and a drawer front 42. The drawer base 41 comprises a support 50 on which two storage containers 106 can be supported, as shown in FIGS. 7*c* and 7*d*. The position of the storage container 106 being located closest to the front 42 is referred to as a front position P1, while the position of the storage container 106 being located distant from the front 42 is referred to as a rear position P2.

Figure 6:
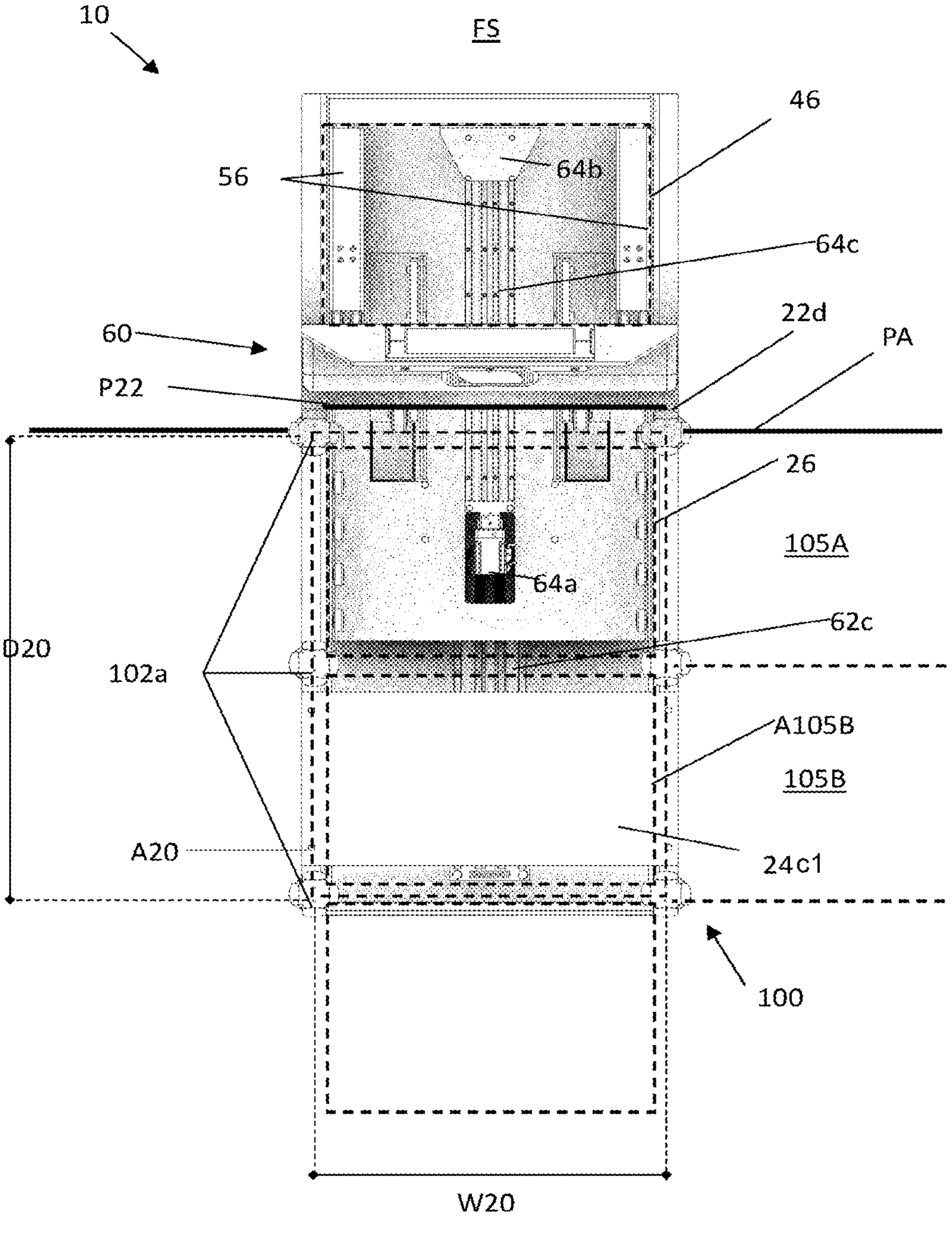
FIG. 6 is a top view of the access station of FIG. 4 without any storage containers.

It is now referred to FIGS. 5 and 6. Here it is shown that the support 50 comprises rollers or wheels 54 for supporting the storage container 106 in the rear position P2. The support 50 also comprises a weight sensor 56 for measuring a weight of the storage container 106 when supporting the storage container 106 in the front position P1. A storage container 106 may slide along the weight sensor 56 and further onto the wheels 54 without much resistance.

The second actuator 64 is mounted to the drawer base 41 and comprises an electric motor 64*a* and an actuating element 64*b* in the form of a vertical plate movable by means of the electric motor 64*a* along a guide or rail 62*c*. The second actuator 64 may then push a storage container 106 from the first position P1 to the second position P2, as will be described further in detail below. It should be noted that due to the sliding surface of the weight sensor 56 and due to the wheels 54, the power required to move the storage container 106 is relatively low.

The electric motor 64*a* is here a linear motor. However, the electric motor 64*a* could also be a rotating motor for moving the actuating element 64*b* by means of a chain drive, a belt drive etc.

The drawer 40 is provided within the drawer compartment 25 in the retracted position RP and at least partially protruding from the framework structure 100 in the presentation position PP. In the presentation position PP, the storage container in the first position P1 is accessible for the picker P, while the storage container in the second position P2 is still provided withing the drawer compartment 25.

The drawer further comprises wheels 44, 45 secured below the drawer base 41, on the rear side of the drawer front 42. The wheels 44,45 are running on plate 24*c*2 and on the horizontal lower guiding plate 22*c* during the movement of the drawer between its retraced position and its presentation position. In the present embodiment, the horizontal lower guiding plate 22*c* is a continuation of the plate 24*c*2, i.e. they are made as one plate member.

Access Module 20

In FIG. 4 and FIG. 5 it is shown that the frame 21 comprises two side plates 24*a* and cross members 24*b* connecting the two side plates to each other. The two side plates 24*a* are also connected to each other by means of an upper horizontal cross plate 24*c*1, where storage containers 106 can be stacked above each other on the horizontal cross plate 24*c*1 in column 105B. The two side plates 24*a* are also connected to each other by means of a lower cross plate 24*c*2.

Figure 9:
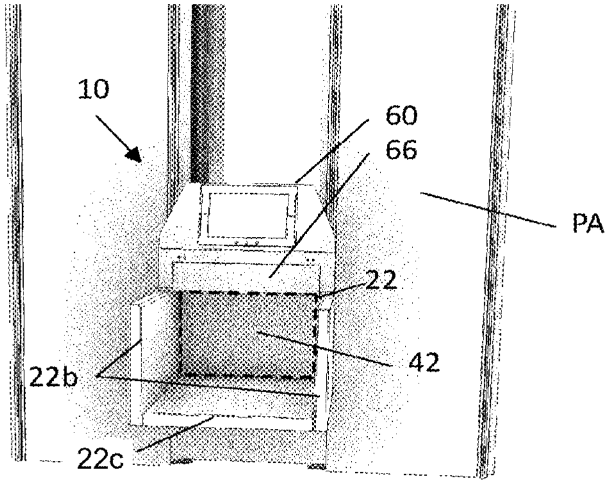
FIG. 9 is a front perspective view of the embodiment of the access station integrated with a framework of an automated storage and retrieval system.
Figure 10:
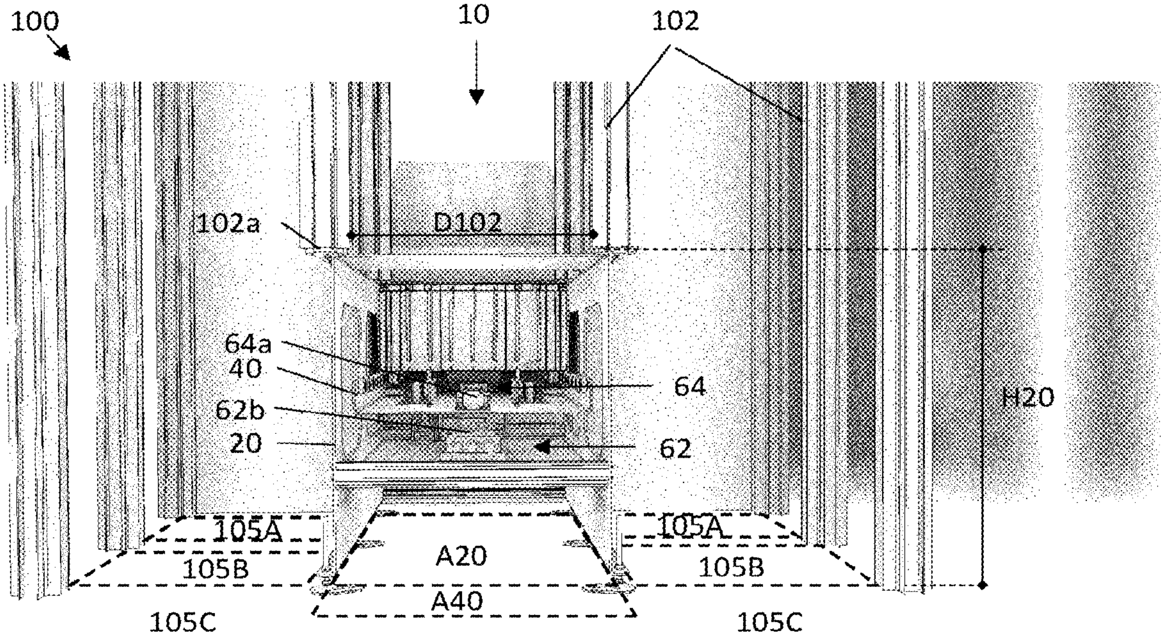
FIG. 10 is a rear view of the access station in FIG. 9.

It is now referred to FIGS. 6, 9 and 10, wherein it is shown that the access module 20 is partially integrated with the framework structure 100. In FIG. 6, the plane P22 of the front opening 22 is defining a separation plane between a front side FS outside of the framework structure 100 and a rear side RS inside of the framework structure 100. The plane P22 is parallel to, and has a short distance (preferably a few centimetres) from, panels PA secured to the outer upright members 102 of the framework structure 100. Alternatively, the panels themselves may be define the separation plane between the front side FS and the rear side RS.

The rear side RS is shown in FIG. 10. Here, it is shown that the frame 21 comprises lintels 102*a* for supporting upright members 102 of the framework structure 100. Hence, the frame 21 is forming a support for some of the upright members 102 of the framework structure 100.

In FIG. 10, a row of storage columns 105A are located adjacent to the panels PA. The next row of storage columns is indicated as storage columns 105B, and the next row of storage columns again is referred to as storage columns 105C.

As shown, the frame 21 has a footprint area A20 within the framework structure 100 corresponding to an area of two storage columns including at least parts of the area of surrounding upright members 102. In FIG. 6, the area of the top opening 26 is substantially equal to the area of one storage column 105A, which again is equal to an area A105B of the adjacent storage column 105B, which again is equal to the area of the other storage columns. As shown, the footprint area A20 is larger than the sum of the area of the top opening 26 and the area A105B, as parts of the areas of surrounding upright members 102 are included in the footprint area A20. The footprint area A20 is here defined as the area limited by the centre axis through six upright members enclosing two storage columns 105A, 105B.

In FIG. 6, it is further shown that the footprint area A20 has a width W20 corresponding to one storage column width and a depth D20 corresponding to two storage columns depths measured between adjacent centre axis of the upright members 102.

It should be noted that above, the footprint area A20 is defined as the rear side footprint area A20, i.e. the footprint area A20 within the framework structure 100. This footprint area A20 is an indication of reduction of the storage capacity of the automated retrieval and storage system 1 due to the access station 10.

In an alternative embodiment, the two side plates 24*a* are also connected to each other by means of a horizontal cross plate 24*d* (shown in FIG. 7*b*), where storage containers 106 can be stacked above each other on the horizontal cross plate 24*d* in column 105C. In this case, the frame 21 has a footprint area A20 within the framework structure 100 corresponding to an area of three storage columns including at least parts of the area of surrounding upright members 102. It should be noted that the function of the horizontal cross plate 24*d* may be provided with a separate plate connected between upright members 102 of the framework structure 100. Hence, the function of the horizontal cross plate 24*d* is not necessarily a part of the access station 10 per se.

In FIG. 9, it is shown that on the front side FS, the frame 21 comprises vertical side guiding plates 22*b* for guiding the drawer front 42 as it extends out to the presentation position PP and as it retracts to the retracted position RP. The frame 21 also comprises a horizontal lower guiding plate 22*c* for guiding the lower end of the drawer front 42.

The vertical side guiding plates 22*b* and the lower guiding plate 22*c* are a snug fit to the drawer front 42 to reduce gaps and a possible risk of crushing fingers/hands during movement of the drawer 40.

The side guiding plates 22*b* and the lower guiding plate 22*c* are fixed in relation to the access station and the automated storage and retrieval system 1 and is therefore visible for the picker P and other persons working near the framework of the system 1. Hence, when the drawer 40 is moved from the retracted position RP to the presentation position PP, this movement will not create a surprising obstacle for nearby personnel, as the drawer front 42 is moved in the space between the vertical guiding plates 22*b* and the lower, horizontal guiding plate 22*c*.

It is now referred to FIG. 5, wherein it is shown that the frame 21 comprises a guard 22*d* defining an upper border of the front opening 22. The side guiding plates 22*b*, the lower guiding plate 22*c* and the guard 22*d* in the vertical plane P22 together define the borders of the front opening 22, as indicated in FIG. 5 and in FIG. 9.

The first actuator 62 is mounted to the lower cross plate 24*c*2 and comprises a linear motor 62*a*, an actuator element 62*b* and a guide 62*c* for guiding the linear movement of the actuator element 62*b*. The actuator element 62*b* is connected to the underside of the drawer 40, as shown in FIG. 7*c* and FIG. 10.

Safety Mechanism

Figure 11:
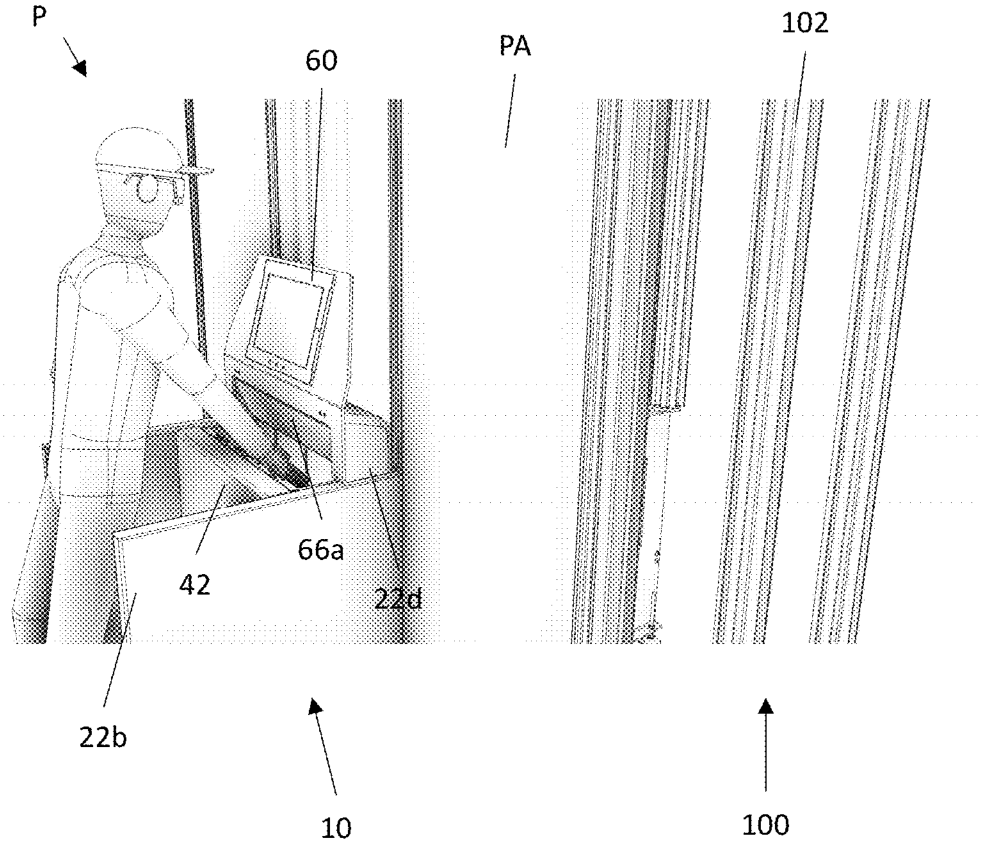
FIG. 11 illustrates a picker with his hands in a position where the safety mechanism is activated.
Figure 12:
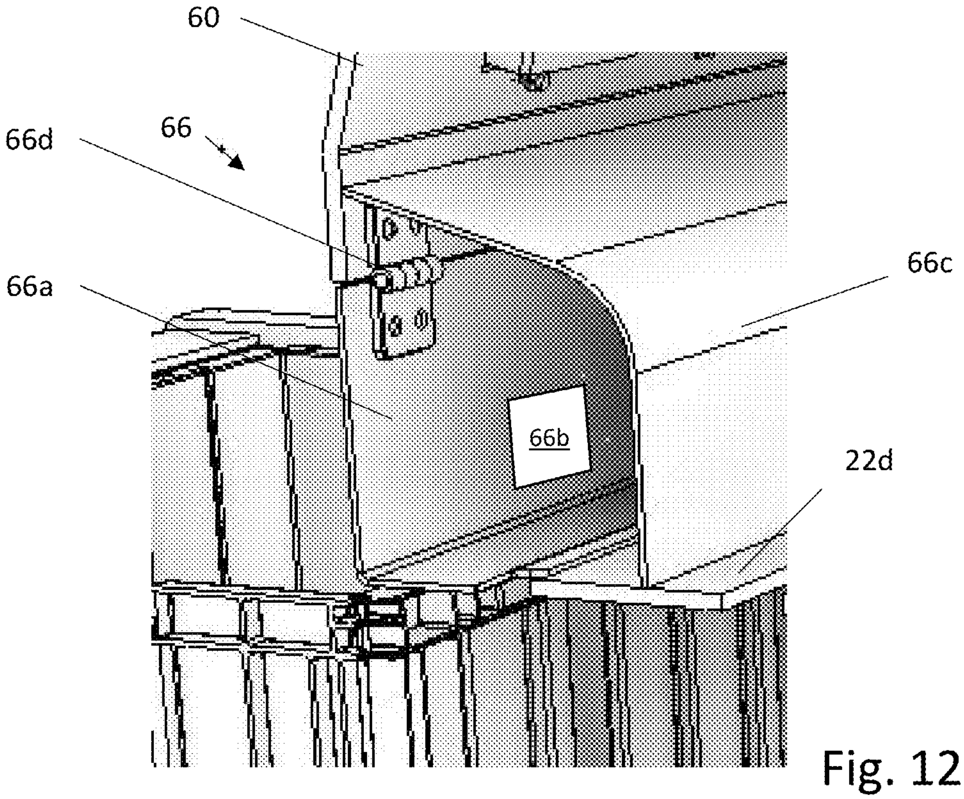
FIG. 12 is an enlarged view of box A in FIG. 7*d*.

It is now referred to FIGS. 11 and 12, where it is shown that the access station 10 comprises a safety mechanism 66 for preventing an object (typically the pickers fingers/hands) from being squeezed between the drawer front 42 and the guard 22*d* during movement of the drawer 40 from the presentation position PP to the retracted position RP.

The safety mechanism 66 comprises a flap element 66*a* provided adjacent to, and on the front side FS of, the guard 22*d*, and a sensor 66*b* for sensing movement of the flap element 66*a* relative to the guard 22*d*. The flap element 66*a* is movably connected to a flap holding structure 66*c* secured to the frame 21 by means of one or more hinges 66*d*.

In one aspect, the flap holding structure 66*c* is secured to the guard 22*d*. In one aspect, the flap element 66*a* is movably connected to the flap holding structure 66*c* by means of one or more hinges 66*d*.

The flap holding structure 66*c* is a supporting structure for a user interface system for example comprising a touch screen or other type of user interface.

The sensor 66*b* may be an integrated circuit type of sensor, such as an accelerometer etc., connected to the first actuator 62. The sensor 66*b* may be a push-button type of security switch, which are activated by the movement of the flap element 66*a*. Sensors 66*b* of this type are known to a person skilled in the art.

When activated, the sensor 66*b* controls the first actuator 62 to stop the movement of the drawer or controls the first actuator 62 to move the drawer 40 out from the compartment 25 again. The sensor 66*b* may also control the second actuator 64 to stop the movement of the actuating element 64*b* or to move in the reverse direction. The sensor 66*b* may be connected directly to the first and/or second actuator 62,64. Alternatively, the sensor 66*b* is connected to the first and/or second actuator 62,64 via the control system CS.

It is now referred to FIG. 7*c*, where two double-headed arrows are referred to as DA and DB. The first double-headed arrow indicates a first distance DA between the flap element 66*a* and the storage container in 106 in the front position P1. This distance is needed to be able to obtain access to the storage container 106 in the first position when the drawer 40 is in the presentation position PP and to be able to lift the storage container in the first position P1 up/down through the top opening 26 when the drawer is in the retracted position RP. The second double-headed arrow indicates a second distance DB between the storage container 106 in the front position P1 and storage container 106 in the rear position P2. This distance is needed to be able to be able to lift the storage container in the second position P2 up/down through the top opening 26 when the drawer is in the presentation position PP. The first distance DA is equal to, or substantially equal to the second distance DB.

In FIG. 7*c*, it is shown that the drawer 40 in the retracted position RP projects into the third column 105C. Hence, even if the frame 21 only has a footprint area A20 of two storage columns including at least parts of the area of surrounding upright members 102, the drawer 40 will prevent storage containers 106 from being stacked in full height in the third storage column 105C. This is indicated as area A40 in FIG. 10.

However, the plate 24*d* described above may allow storage containers to be stacked also in the third column 105C, the third column 105C having a reduced stacking height corresponding to the height H20 of the frame 21.

Operation of the Access Station

The different steps for operation of the access station 10 are shown in FIG. 13*a-h*.

Figure 13A:
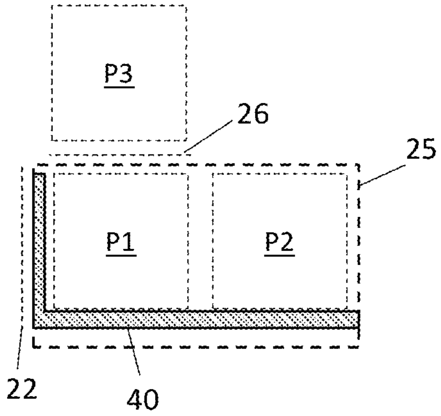
FIG. 13*a-h* illustrates the steps of operating the embodiment of the access station in detail.
Figure 13B:
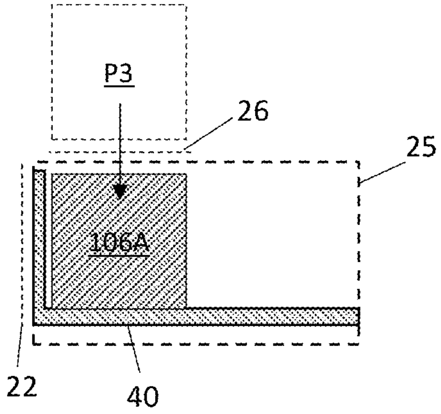
Figure 13C:
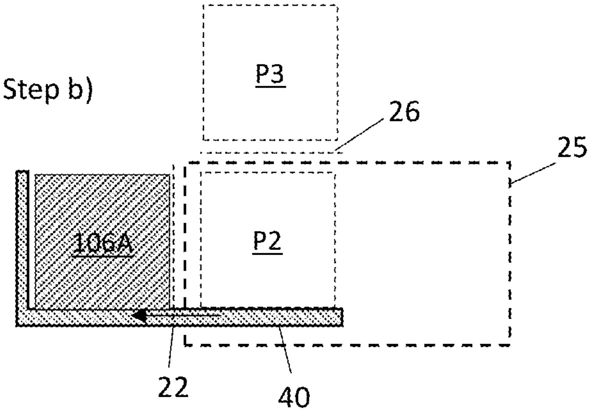
Figure 13D:
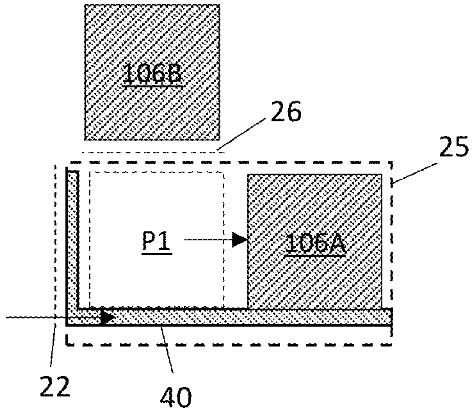
Figure 13E:
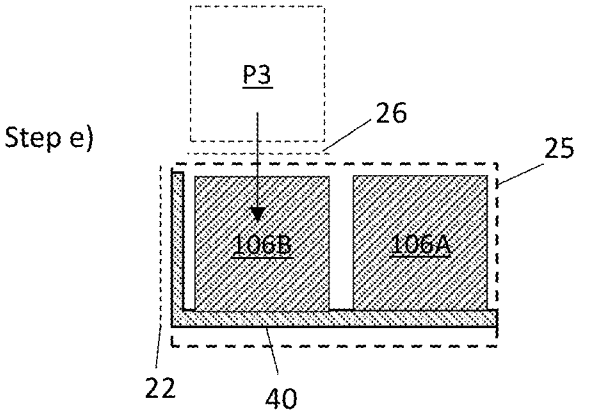
Figure 13F:
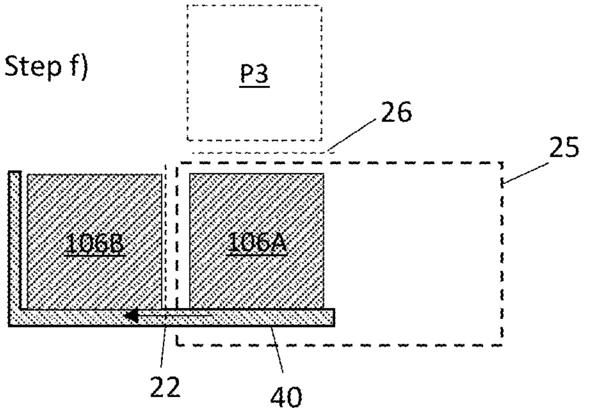
Figure 13G:
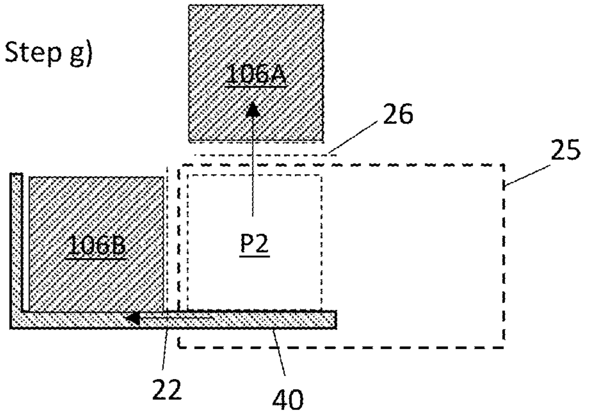
Figure 13H:
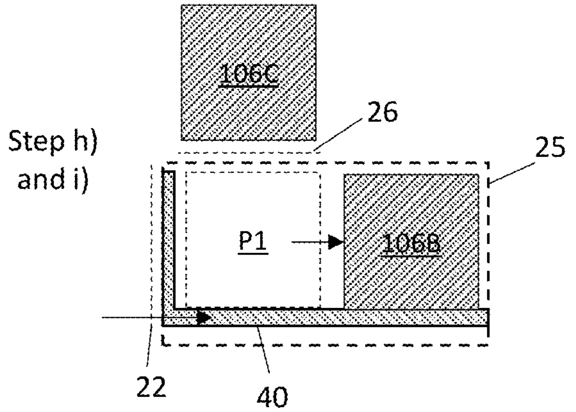

Initially, in FIG. 13*a*, there are no storage containers 106 in the drawer 40 and there is no storage container 106 in the buffer position P3 in the first storage column 105A. The drawer 40 is in the retracted position RP.

In a first step a) (FIG. 13*b*) the access station 10 receives a first storage container 106A. A container handling vehicle 201, 301 is controlled to pick a first storage container 106A from one of the storage columns 105 in the framework structure 100 and to lower it down into the front position P1 of the drawer 40. On its way down the storage column 105A, the first storage container 106A will pass the buffer position P3.

In a second step b) (FIG. 13*c*), the first actuator 62 is controlled to move the drawer 40 to the presentation position PP. Here, the first storage container 106A is presented to the picker P.

In a third step c) (FIG. 13*d*), the first actuator 62 is controlled to move the drawer 40 to the retracted position RP within the access module 20. In a next step d), the second actuator 64 is controlled to move the first storage container 106A from the front position P1 to the rear position P2 of the drawer 40. It should be noted that step c) may be performed before step d). Alternatively, step c) and d) may be performed simultaneously or substantially simultaneously. The safety mechanism will stop the movement of the drawer 40 if a finger/hand is located within the storage container on its way into the compartment 25 and will also stop the movement of the drawer 40 if a finger/hand is located between the front plate and the storage container on its way into the compartment 25.

After step c) and d), the drawer 40 is in the retracted position RP and the first storage container 106A is in the rear position P2. The actuator element 64*b* will now return to its original position close to the front 42 of the drawer 40.

During or after step c) and d), the container handling vehicle 201, 301 may be controlled to pick a second storage container 106B from one of the storage columns 105 in the framework structure 100 and to lower it down to the buffer position P3.

In a next step e) (FIG. 13*e*), the access station 10 receives the second storage container 106B from the buffer position P3. The second storage container 106B is lowered down into the front position P1 of the drawer 40. It should be noted that the container handling vehicle 201, 301 may hold the second storage container 106B stationary in the buffer position P3 while waiting for steps c) and d). However, the container handling vehicle 201, 301 may also be coordinated with the access station 10 so that there is no waiting time for the second storage container 106B in the buffer position P3.

In a next step f) (FIG. 13*f*), the first actuator 62 is controlled to move the drawer 40 to the presentation position PP in which the second storage container 106B is presented to the picker P.

During or after step f), the first storage container 106A is retrieved from the rear position P2 by means of a container handling vehicle 201, 301.

In a next step g) (FIG. 13*h*), the first actuator 62 is controlled to move the drawer 40 to the retracted position RP within the access module 20. In a next step h), the second actuator 64 is controlled to move the second storage container 106B from the front position P1 to the rear position P2 of the drawer 40. Hence, steps g) and h) are similar to the above steps c) and d).

The actuator element 64*b* will now return to its original position close to the front 42 of the drawer 40.

During or after step f) and h), the container handling vehicle 201, 301 may be controlled to pick a third storage container 106C from one of the storage columns 105 in the framework structure 100 and to lower it down to the buffer position P3.

The above steps are then repeated.

Alternative Embodiments

Figure 14:
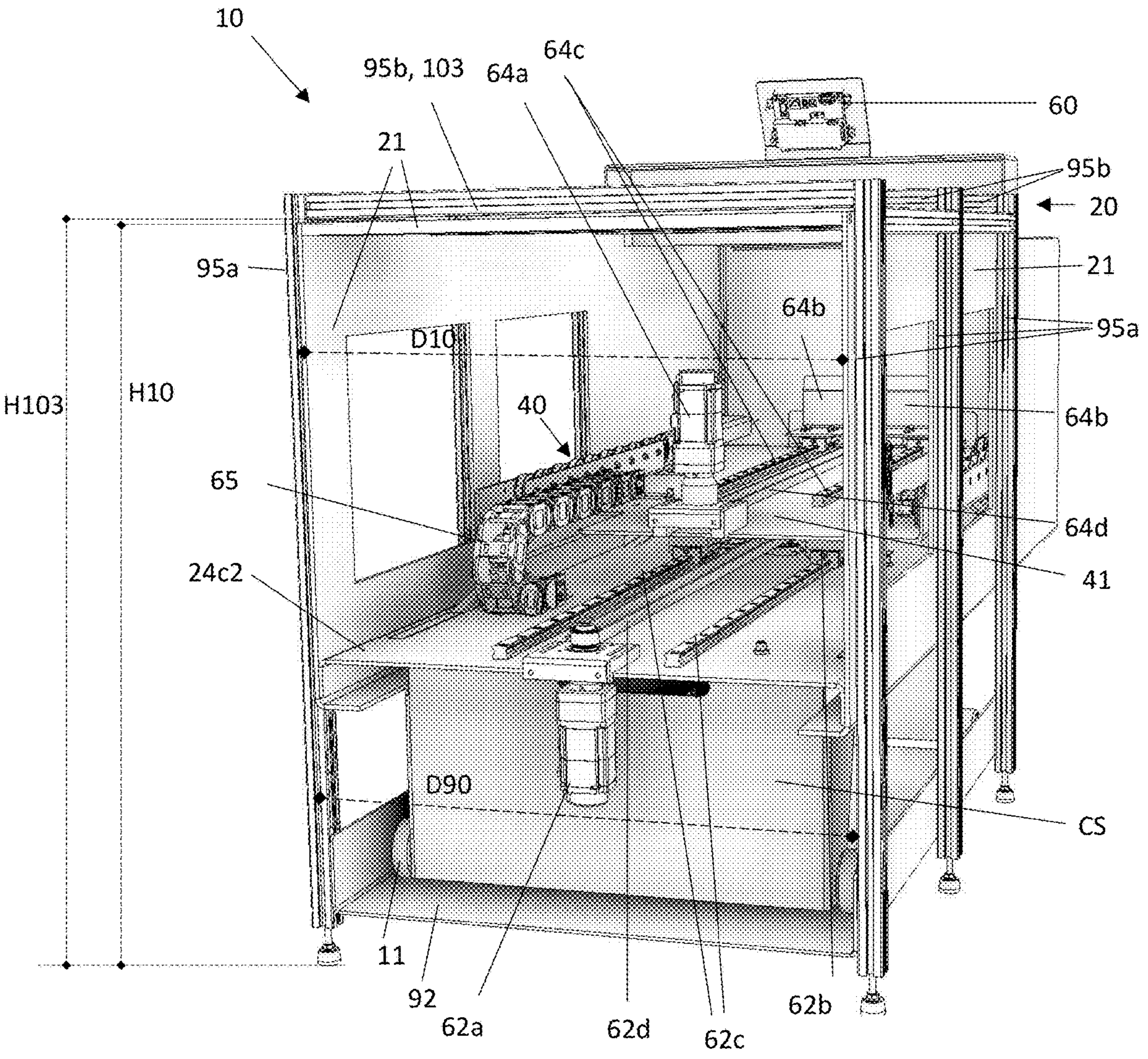
FIG. 14 illustrates a rear perspective view of a further embodiment of the access station and parts of the framework structure.
Figure 15:
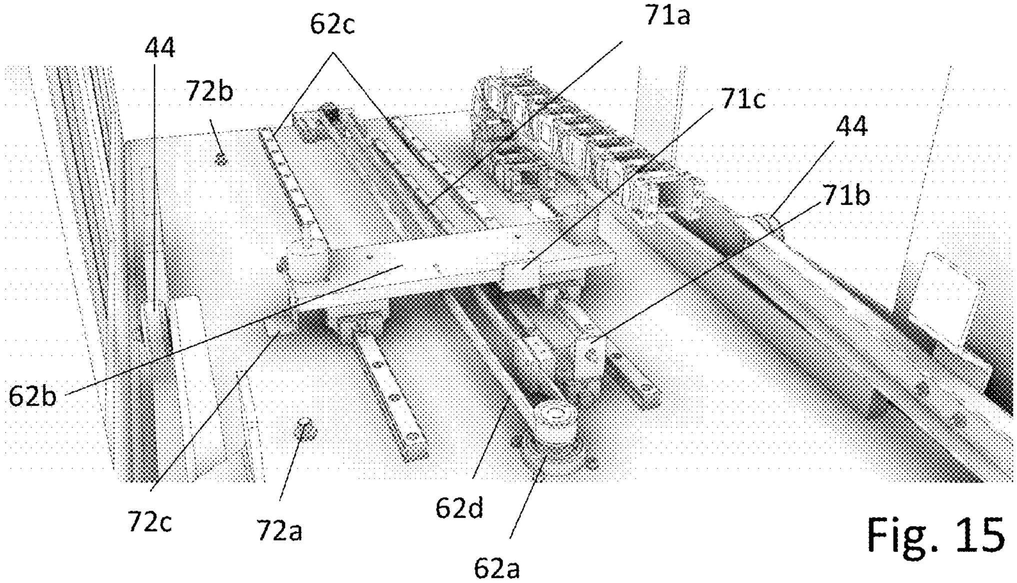
FIG. 15 illustrates an enlarged perspective view of a first actuator (the drawer base is removed from the drawing).
Figure 16:
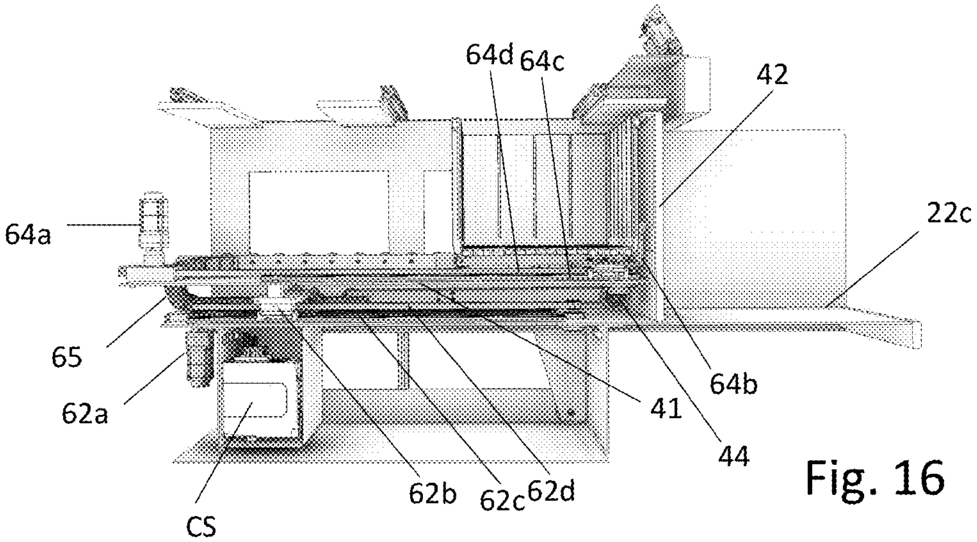
FIG. 16 illustrates a side view of the embodiment of FIGS. 14 and 15.

It is now referred to FIGS. 14-16. Most of the technical features of the access station 10 and the operation of the access station 10 is identical to or similar to the embodiment described above. Only differences between the embodiment described above and this alternative embodiment will be described below.

First, it should be noted that the first actuator 62 and the second actuator 64 works substantially in the same way as in the above embodiment.

The first actuator 62 comprises an electric rotating motor 62*a* for driving a belt 64*d*, to which the actuator element 62*b* is connected. The actuator element 62*b* is further connected to the drawer 40 and the drawer 40 is moved by means of the electric rotating motor 62*a* via the belt 62*d* and the actuator element 62*b*. The movement of the actuator element 62*b* is guided along rails 62*c* engaged with the actuator element 62*b*.

It is now referred to FIG. 15. Here it is shown that the access station 10 comprises a presentation position sensor 72*a* and a retracted position sensor 72*b*. It is also shown that the actuator element 62*b* comprises a sensor engaging part 72*c*, here in the form of a bracket protruding to a position in which the sensor engaging part 72*c* is brought adjacent to, or in contact with, the presentation position sensor 72*a* when the drawer 40 is in the presentation position PP and adjacent to, or in contact with, the retracted position sensor 72*b* when the drawer 40 is in the retracted position. The sensors 72*a*, 72*b* may be optical sensors, capacitive sensors, a contact-type of sensor etc. The sensors 72*a*, 72*b* are connected to the control system CS.

In FIG. 14 and FIG. 15 it is further shown an energy chain 65 for guiding and protecting electrical conductors and signal conductors between the control system CS and the weight sensor and electric motor of the drawer.

In FIG. 15, it is shown that the access station 10 comprises a further safety system comprising a rail 71*a* for guiding a linear movement of a first magnet element 71*b*. The first magnet element 71*b* is connected to, and driven by, the belt 62*d* of the second actuator 62. A second magnet element 71*c* is connected to the actuating element 62*b* of the second actuator 62. The first and the second magnet elements 71*b*, 71*c* are magnetically connectable to each other.

It is now assumed that the drawer 40 (and hence the actuator element 62*b*) are in the retracted position. The belt 62*d*, including the first magnet element 71*b* is now moved by means of the motor 62*a*. Due to the magnetic coupling between the first and second magnet elements 71*b*, 71*c*, the first magnet element 71*b* will pull the actuating element 62*b* towards the presentation position PP as the belt moves. If the drawer 40 is held back, for example by an object obstructing the movement of the drawer from the retracted position RP to the presentation position PP, the first and the second magnet elements 71*b*, 71*c* will be pulled away from each other, causing the drawer 40, the actuating element 62*b* and hence the second magnet element 71*c* to stop while allowing the first magnet element 71*b* and the belt 62*d* to continue its linear movement. During movement of the first magnet element 71*b* and the belt 62*d* back to their initial position, the first magnet element 71*b* will reconnect to the second magnet element 71*c* again.

The second actuator 64 comprises a rotating electric motor 62*a* for driving a belt 64*d* to which the actuator element 64*b* is connected. The actuator element 64*b* is moved by means of the electric rotating motor 64*a* via the belt 64*d*. The movement of the actuator element 64*b* is guided along rails 64*c* engaged with the actuator element 64*b*.

Figure 17:
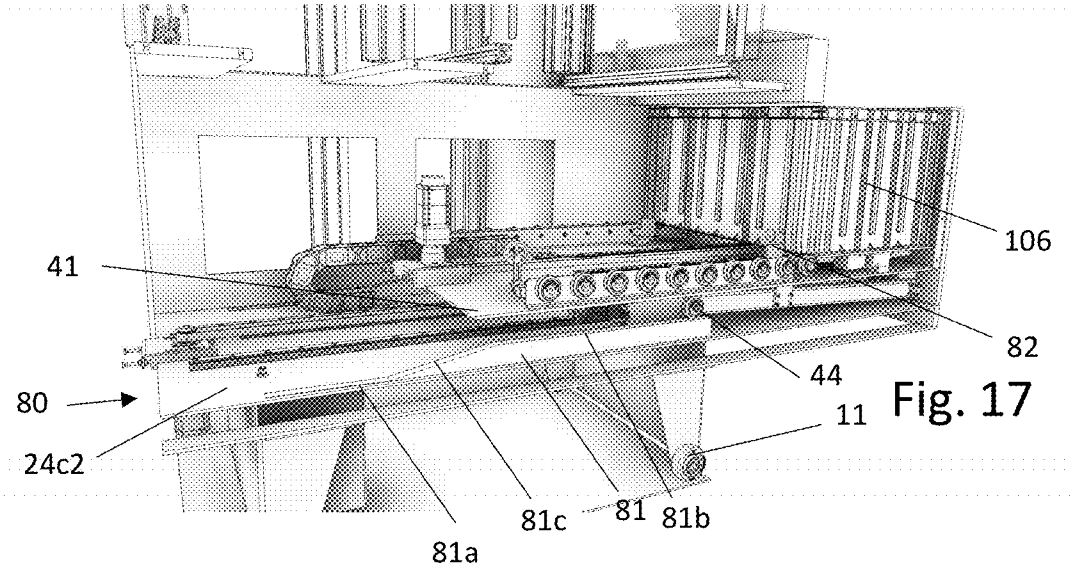
FIG. 17-19 illustrates details of a container stop.
Figure 18:
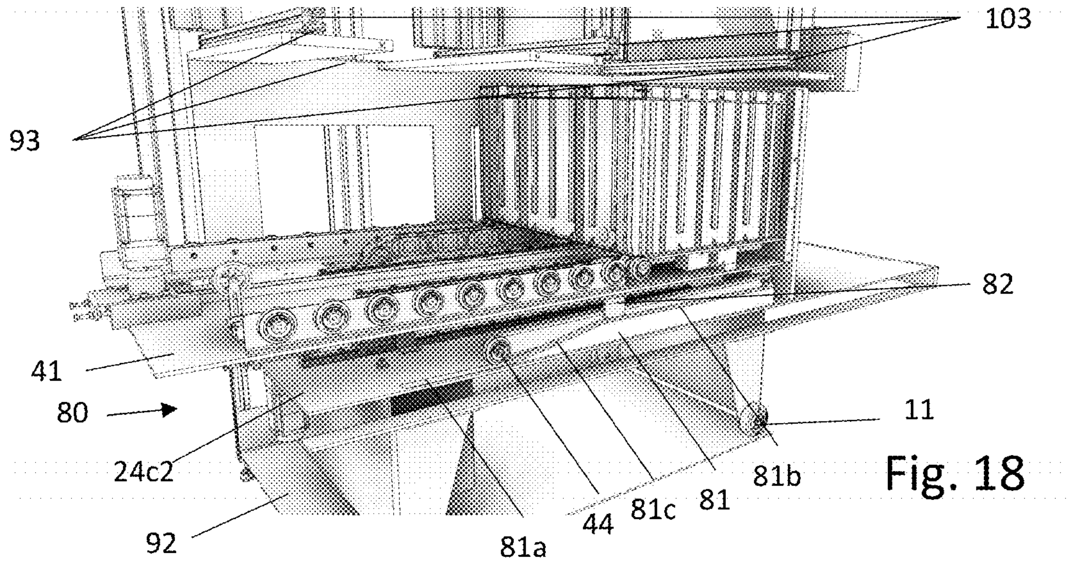
Figure 19:
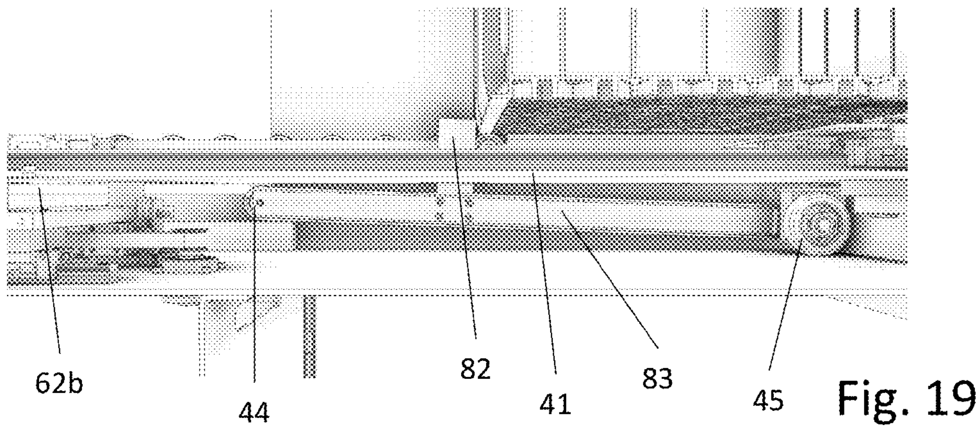
Figure 20:
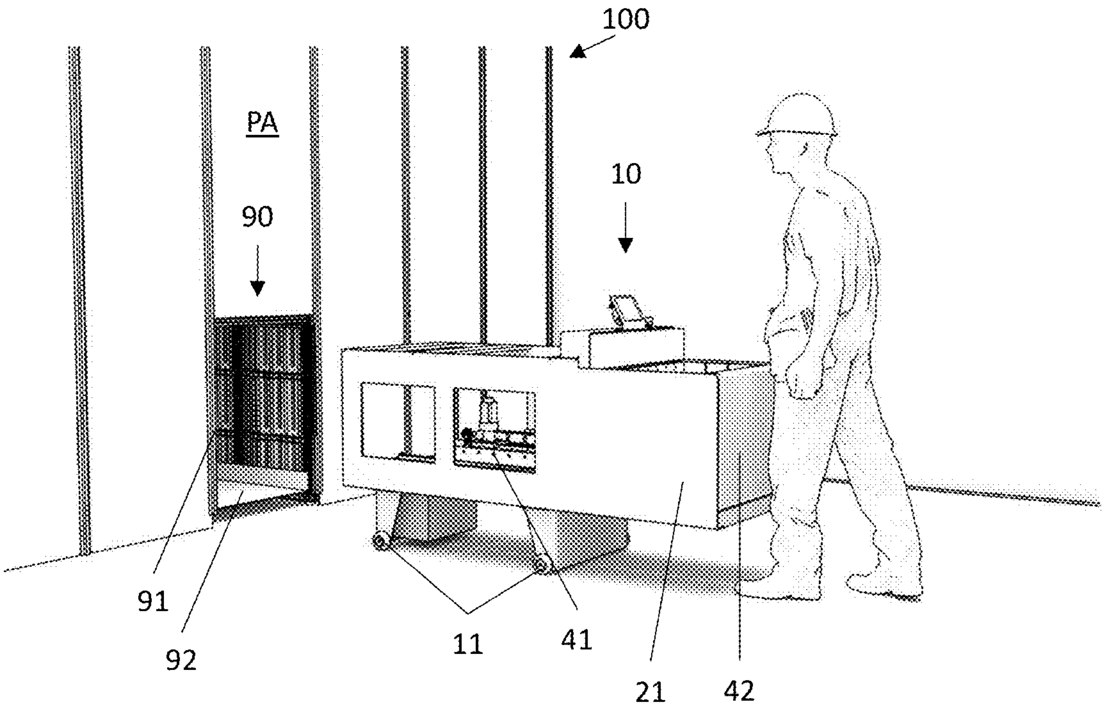
FIG. 20 illustrates how an access station can be inserted into and retrieved from an access station compartment.

It is now referred to FIGS. 17-19. Here, details of a container stop 80 is illustrated. Initially, it should be mentioned that the drawer base 41 is supported on the plate 24*c* via the actuating element 62*b* of the second actuator 62 and by wheels 44, 45 connected to each other by means of a wheel connector member 83.

The container stop 80 comprises a profile 81 secured to the plate 24*c*2, the profile having a lowered profile section 81*a*, an elevated profile section 81*b* and an intermediate, inclining, profile section 81*c* between the profile sections 81*a*, 81*b*.

The container stop 80 further comprises a container stop element 82 secured to the wheel connector member 83.

The rear wheels 44 are running on top of the profile 81. In FIG. 17 the drawer is in the presentation position (PP). Here, the rear wheels 44 are located on the elevated profile section 81*b*, causing the rear part of the wheel connector member 83 to tilt upwardly, and hence causing the container stop element 82 to protrude up on the rear side of the storage container 106 in the front position P1. Movement of the storage container 106 from the front position to the rear position (for example by a person trying to push the storage container) is now prevented. It is also possible for the container stop element 82 to prevent the storage container 106 to be lifted up from the drawer in the presentation position (to prevent theft etc).

In FIG. 16, the drawer is in the retracted position (RP). Here, the rear wheels 44 are located on the lowered profile section 81*a*, causing the rear part of the wheel connector member 83 to tilt downwardly, and hence causing the container stop element 82 to retract down from the rear side of the storage container 106 in the front position P1. Movement of the storage container 106 from the front position to the rear position by means of the second actuator 64 is now allowed.

It should be noted that in the first embodiment of the access station 10 described above, the access module 20 is integrated with the framework structure, due to the frame 21 comprising lintels 102*a* for supporting the upright members 102 from below. Hence, service, maintenance and repair operations of the access station may be cumbersome.

In the second embodiment shown in FIG. 17-20, the frame 21 is not supporting the upright members 102 from below. Instead, the access module 20 is one single independent access module with a self-supporting frame 21 provided with wheels 11.

Here, the framework structure 100 comprises an access station compartment 90 having a side opening 91 which can be covered by a panel (PA) when not in use. The access station 10 is then insertable into and retrievable from the access station compartment 90 by rolling the access station 10 into and out from the side opening 91. The access station 10 may comprise a jack for elevating an upper portion of the access station 10 upwardly within the access station compartment 90, for example up towards a roof portion 93 within the access station compartment 90, the roof portion 93 being defined by the downwardly facing surfaces of the horizontal members 103. It is also shown in FIG. 14 that a support plate 92 is secured below the lower ends of the upright members 95*a*. The wheels 11 of the access station 10 are supported onto this support plate 92 when inserted into the access station compartment 90.

In FIG. 14, it is shown that the framework structure 100 comprises a receptacle frame 95 defining the access station compartment 90, wherein the receptacle frame 95 is forming a support for a plurality of upright members 102. In FIG. 14, the receptacle frame 95 comprises upright frame members 95*a*, which are connected to each other by means of cross-members 95*b*, 103.

Figure 24A:
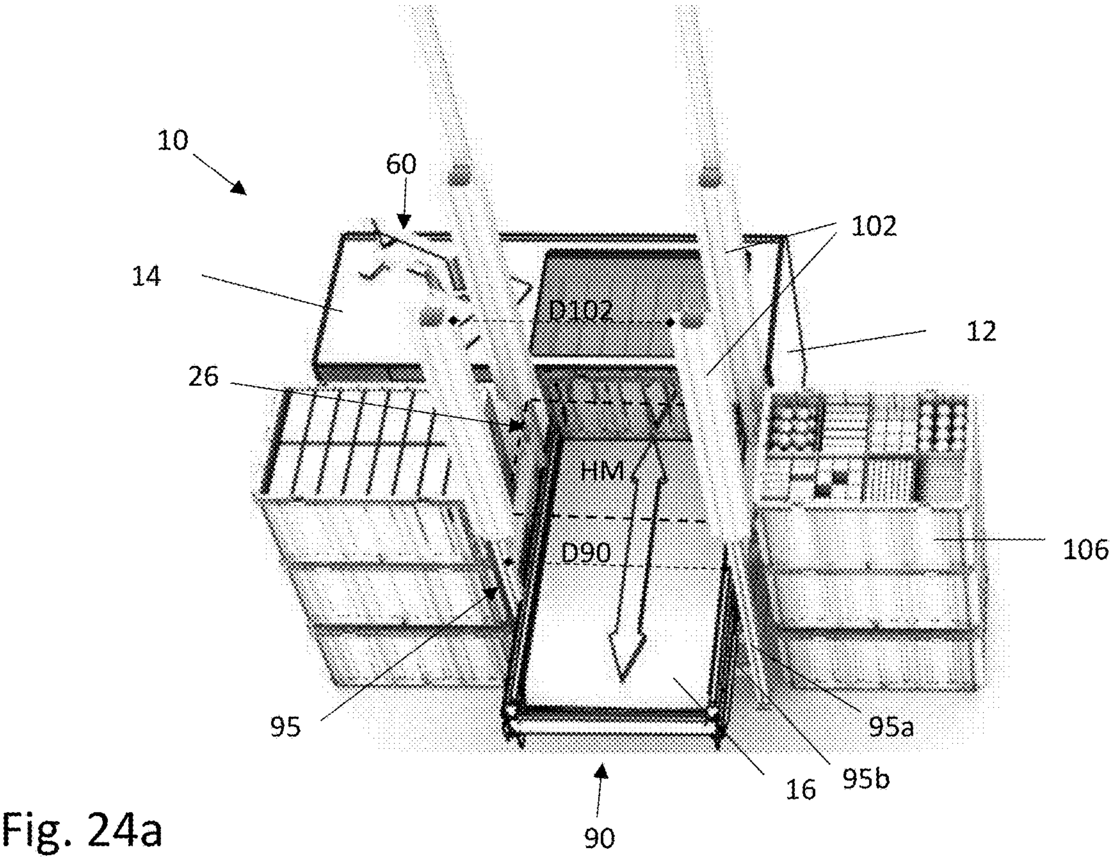
FIG. 24*a* and FIG. 24*b* illustrate perspective views from above of the access station shown in FIG. 21*a*, wherein the wall of the framework structure has been removed.
Figure 24B:
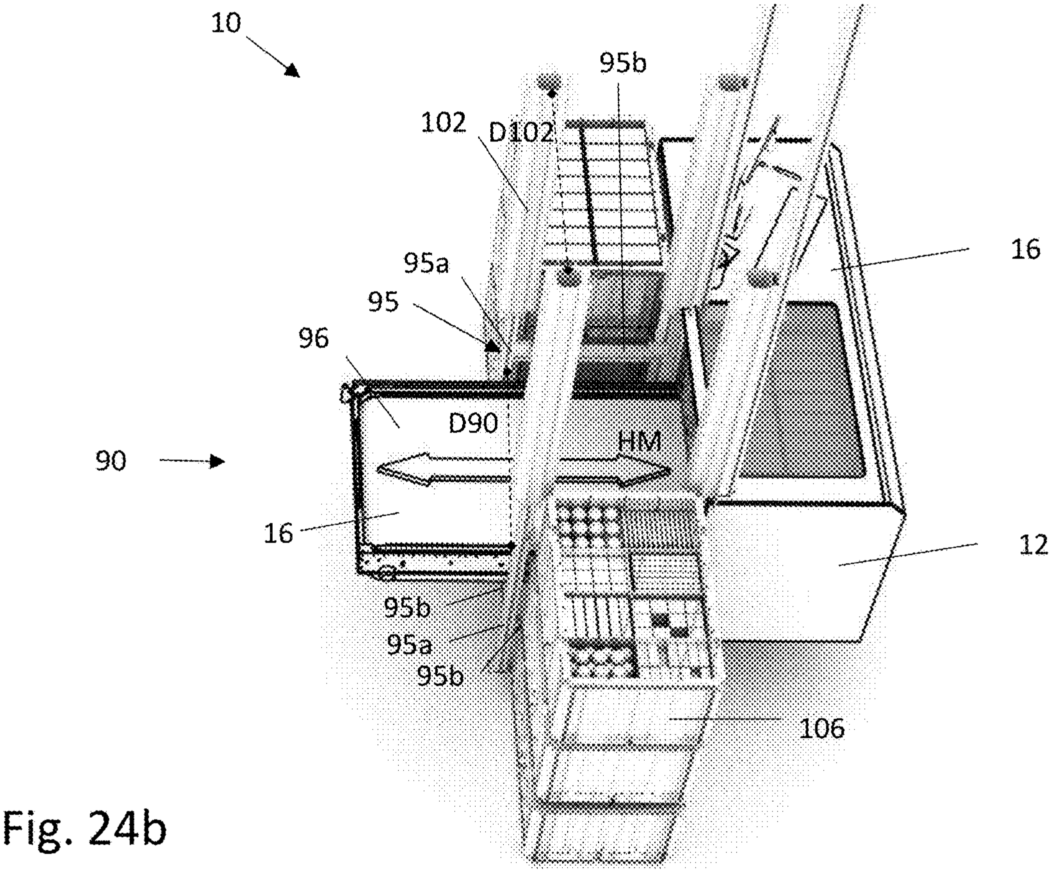

A similar embodiment of the receptacle frame 95 is shown in FIG. 24*a* and FIG. 24*b*. Also here, the receptacle frame 95 comprises upright frame members 95*a* and cross-members 95*b*. It is also here shown how the receptacle frame 95 is forming a support for a plurality of upright members 102 of the framework structure 100.

In FIG. 24*a* and FIG. 24*b* it is further shown that the width D90 of the access station compartment 90, measured as the distance between two upright frame members 95*a*, is larger than a distance D102 between two upright members 102. In the present example, the upright frame members 102 are used to guide the storage containers vertically. To be able to move the storage container horizontally within the access station 10, the width of the access station 10 must be wider than the distance D102 between two upright members 102. It should be noted that the width D90 and the distance D102 are measured perpendicular to the direction of horizontal movement HM of the storage container 106 in the access station 10 (as indicated in FIG. 24*a* and FIG. 24*b*).

It is now referred to FIG. 21*a*-*i*. Here it is shown an access station 10 comprising three modules. The first module is referred to as a main module 12 secured to the outside of the framework structure 100. The main module 12 receives a storage container 106 during a picking/supply operation. The main module 12 is surrounding the opening 91 to the access station compartment 90.

Figure 22:
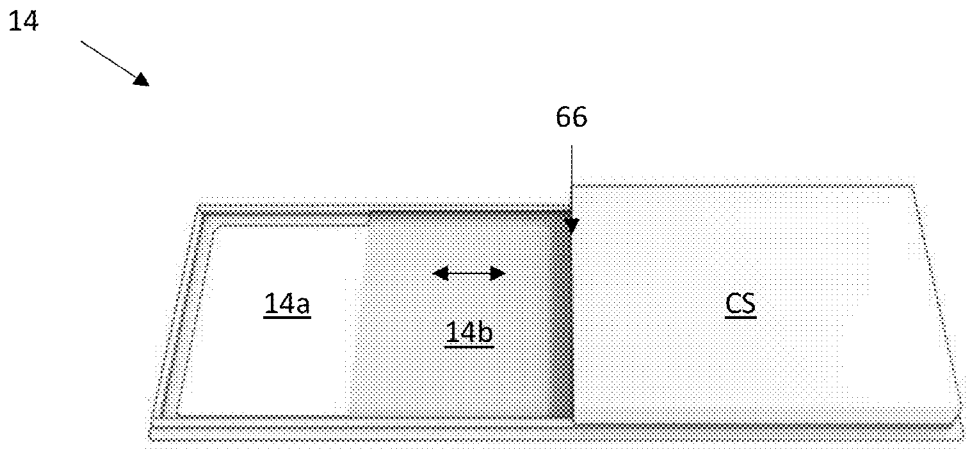
FIG. 22 illustrates the top cover from below.

The second module is a cover module 14 provided above the main module 12 for controlling access to the storage container 106 when received by the main module 12. The second module 14 is shown from below in FIG. 22 and comprises an opening 14*a* which can be closed and opened by a movable cover 14*b*. The control system CS of the access station 10 is also integrated in the cover module 14. Also the actuator (not shown) operating the movable cover 14*b* is provided as a part of the control system CS. It should be noted that the movable cover 14*b* is provided with a safety mechanism 66 to prevent pinch injuries etc.

The third module is a conveyor module 16. The conveyor module 16 comprises a conveyor belt, rollers and motors for powering the conveyor belt. The conveyor module 16 can easily be mounted to the receptacle frame 95 by means of drawer slides 95*c* (FIG. 21*f*). As shown in FIG. 24*a*, the conveyor module 16 will be located below the top opening 26. Hence, storage containers 106 will be lowered onto the conveyor module 16 via the column 105 and the top opening 26 by means of container handling vehicles similar to the embodiments described above, and storage containers 106 will be elevated from the conveyor module 16 through the top opening 26 and the column 105 by means of container handling vehicles similar to the embodiments described above.

The control system CS is connected to the conveyor module 16 and also to the central control system 500 of the automated storage and retrieval system 1.

In FIGS. 24*a* and 24*b*, it is shown that the access station 10 further comprises a user interface 60 in the form of a computer terminal having a display, keyboard and mouse. Alternatively, the user interface 60 may be integrated in the cover module 14.

Figure 21A:
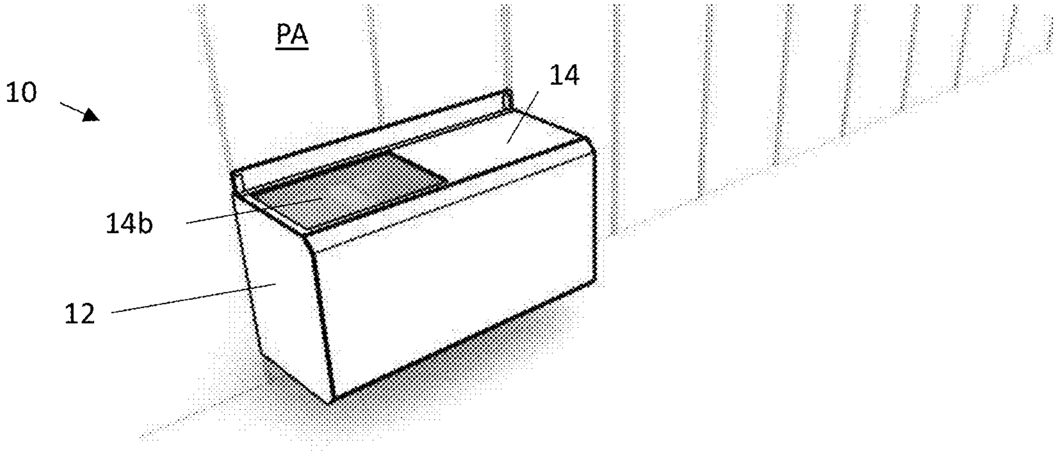
FIG. 21*a*-21*i* illustrate an alternative embodiment of an access station which can be retrieved from (and inserted into) an access station compartment.
Figure 21B:
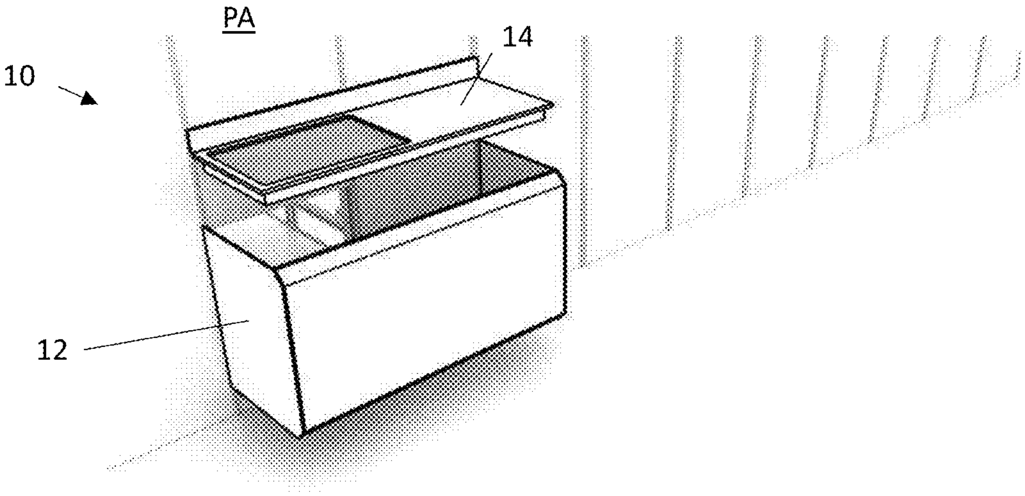
Figure 21C:
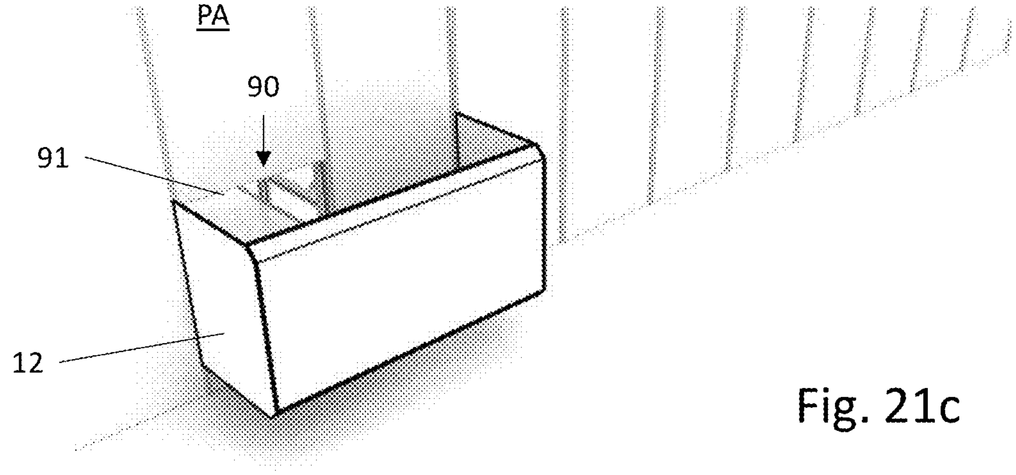
Figure 21D:
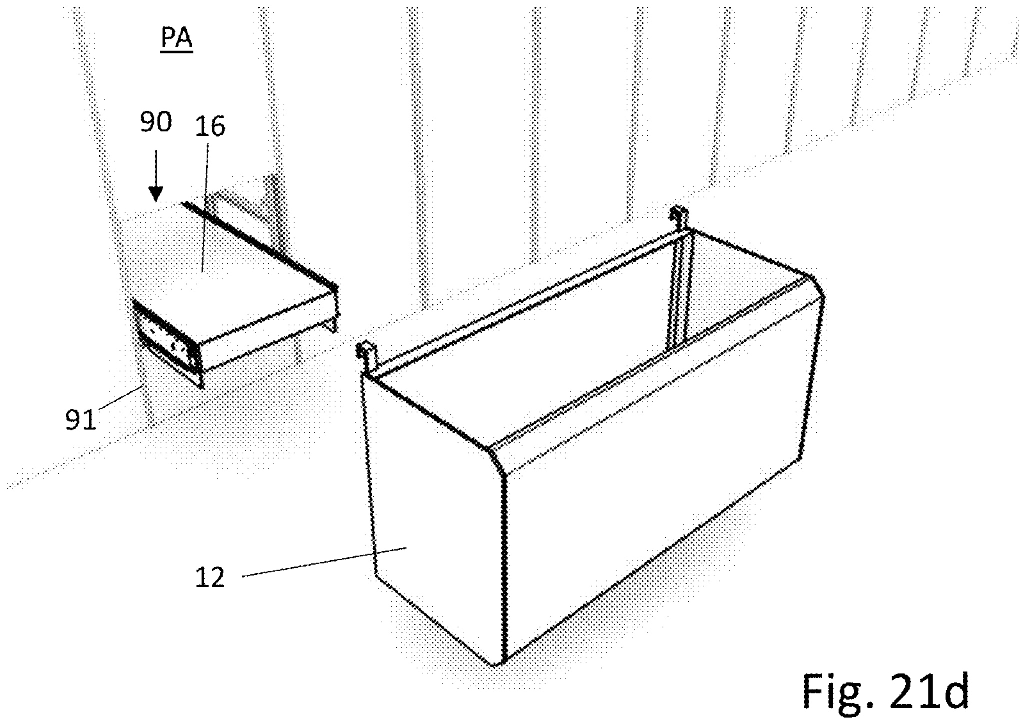
Figure 21E:
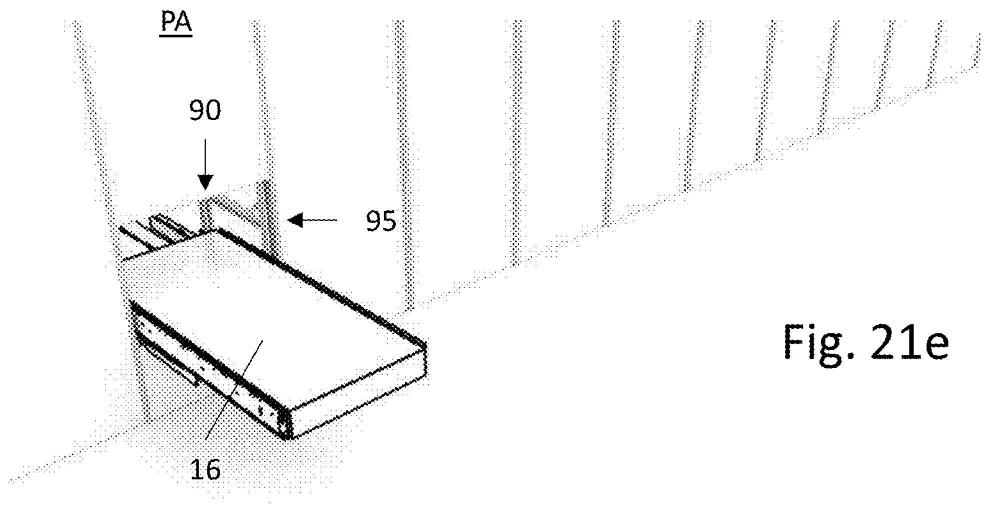
Figure 21F:
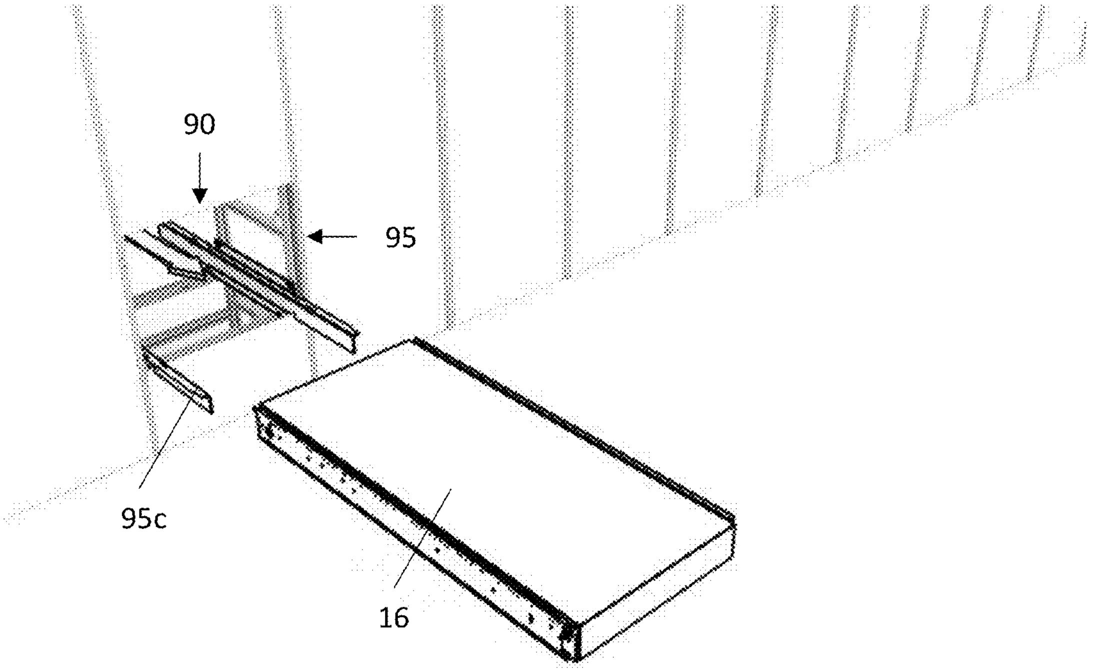
Figure 21G:
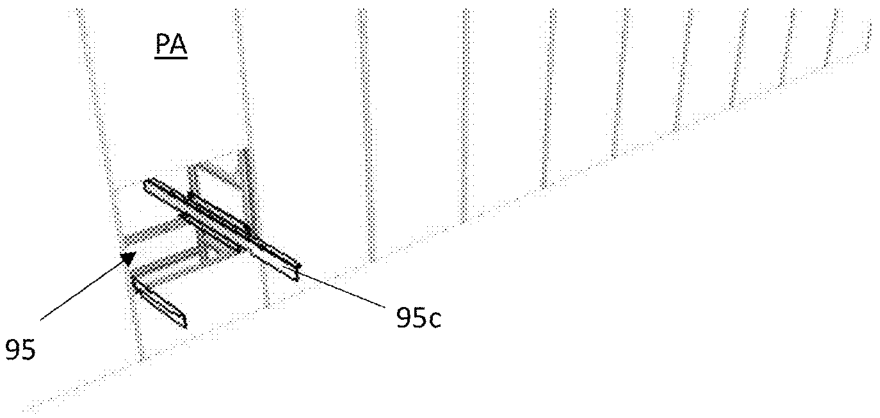
Figure 21H:
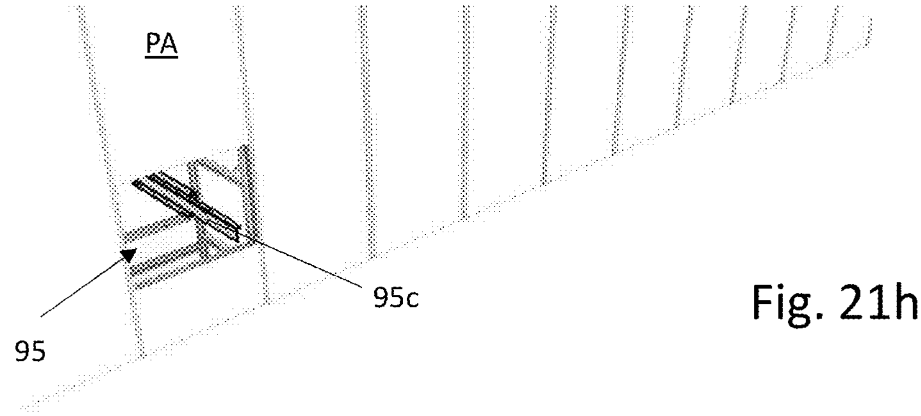
Figure 21I:
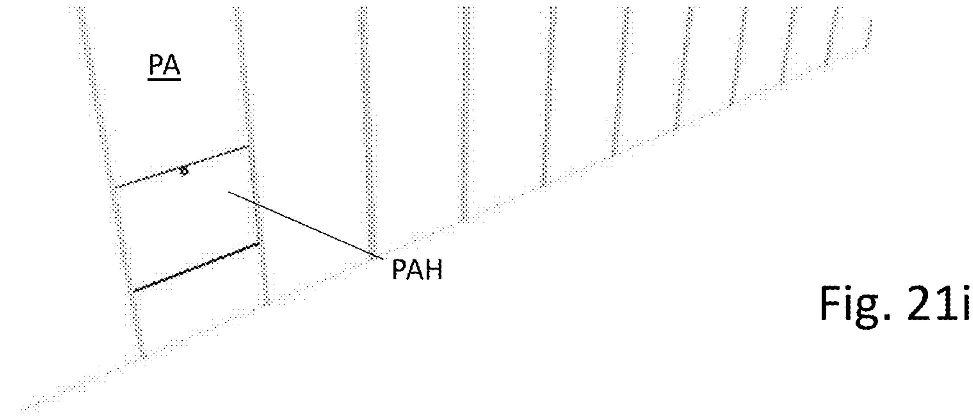

In FIGS. 21*a*-*i*, the sequence of removing the access station 10 is shown. In a first step shown in FIG. 21*b*, the cover module 14 is removed from the main module 12. In FIG. 21*d* the main module 12 is removed from the opening 91. In FIG. 21*e* and FIG. 21*f*, the conveyor module 16 is retrieved from the opening 91. A new conveyor module 16 may now be inserted into the opening. Alternatively, the drawer slides 65*c* may be pushed into the compartment 90 and the opening 91 may be closed by means of a panel hatch.

The steps of installing the access station 10 is performed in the opposite sequence.

Other Alternative Embodiments

In the above description, the vertical movement of the storage containers through the top opening 26 is performed by container handling vehicles 201, 301. Alternatively, a type of container lift may be used to move the storage containers vertically to and from the access station 10.

In the above embodiment, the access station 10 occupies one storage column 105A for vertical transportation of storage containers, and two other storage columns 105B, 105C has reduced storage capacity due to the footprint areas A20, A40.

By reducing the first and second distances DA, DB, it is possible to achieve full storage capacity in the third storage column 105C. This may require a different and/or more space-efficient safety mechanism. One such possible safety mechanism is a movement detection type of sensor, for example a photoelectric sensor for sensing whether or not a finger/hand is present in the area close to the access opening 46 and or the front opening 22 during movement of the drawer 40 towards the retracted position RP.

Figure 23:
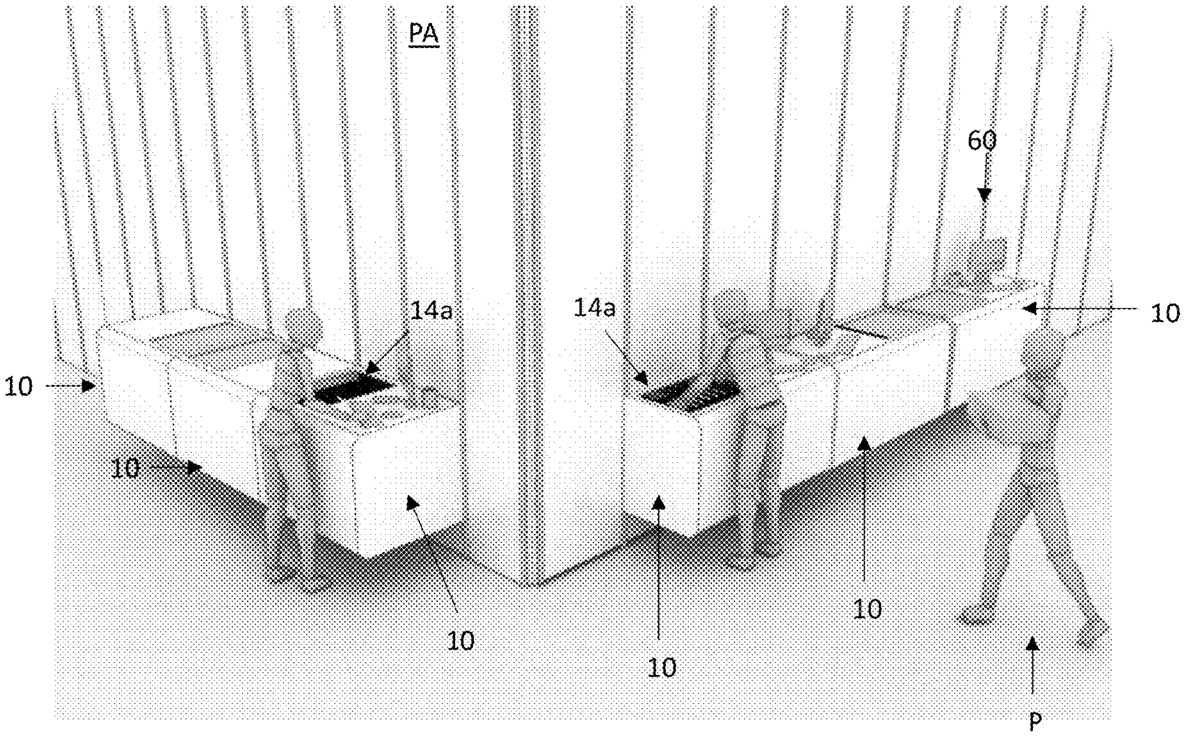
FIG. 23 illustrates several access stations of the type shown in FIG. 21*a* adjacent to each other.

It is now referred to FIG. 23. Here it is shown several access stations 10 of the above type, mounted adjacent to each other. As shown, the orientation of the openings 14*a* differ from each other due to the orientation of the storage containers 106 within the framework structure 100. The access stations on the left side receives the narrow side of the storage containers while the access stations on the right side receives the wide side of the storage containers.

In the preceding description, various aspects of the access station and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

10 access station
11 wheels
12 main module
14 cover module
14*a* opening
14*b* movable cover
16 conveyor module
20 access module
21 frame
22 opening
22*b* vertical side guiding plates
22*c* horizontal lower guiding plate
22*d* guard
24*a* two side plates
24*b* cross members
24*c* plate
24*c*1 upper horizontal cross plate
24*c*2 plate
24*d* horizontal cross plate
25 drawer compartment
26 top opening
40 drawer
41 drawer base
42 drawer front
44 wheels
45 wheels
46 access opening
50 support
54 wheels
56 weight sensor
60 user interface system
62 first actuator
62*a* linear motor
62*b* actuator element
62*c* rail
62*d* belt
64 second actuator
64*a* electric motor
64*b* actuating element
64*c* rails
64*d* belt
65 energy chain
65*c* drawer slides
66 safety mechanism
66*a* flap element
66*b* sensor
66*c* flap holding structure
66*d* hinges
71*a* rail
71*b* first magnet element
71*c* second magnet element
72*a* presentation position sensor
72*b* retracted position sensor
72*c* sensor engaging part
80 container stop
81 profile
81*a* lowered profile section
81*b* elevated profile section
81*c* intermediate profile section
82 container stop element
83 wheel connector member
90 access station compartment
91 side opening
92 support plate
93 roof portion
95 receptacle frame
95*a* upright members
95*b* cross-members
95*c* drawer slides
100 Framework structure
102 Upright members of framework structure
104 Storage grid
105 Storage column
106 Storage container
106' Particular position of storage container
107 Stack
108 Rail system
110 Parallel rails in first direction (X)
112 Access opening
119 First port column
120 Second port column
201 Prior art container handling vehicle
201*a* Vehicle body of the container handling vehicle 201

201*b* Drive means/wheel arrangement/first set of wheels in first direction (X)
201*c* Drive means/wheel arrangement/second set of wheels in second direction (Y)
301 Prior art cantilever container handling vehicle
301*a* Vehicle body of the container handling vehicle 301
301*b* Drive means/first set of wheels in first direction (X)
301*c* Drive means/second set of wheels in second direction (Y)
304 Gripping device
401 Prior art container handling vehicle
401*a* Vehicle body of the container handling vehicle 401
401*b* Drive means/first set of wheels in first direction (X)
401*c* Drive means/second set of wheels in second direction (Y)
500 Control system
A105B area
A20 footprint area
A40 area
CS control system
D10 width
D102 distance
D20 depth
D90 width
DA first distance
DB second distance
FS side
H20 height
HM horizontal movement
P1 first position
P2 rear position
P22 vertical plane
P3 buffer position
PA panel
PP presentation position
RP retracted position
RS rear side
W20 width

The invention claimed is:

1. An automated storage and retrieval system comprising a framework structure, wherein the framework structure comprises:

upright members;

a storage volume comprising columns provided between the upright members, wherein storage containers are stackable in stacks within the columns; and a rail system provided on top of the upright members;

wherein the automated storage and retrieval system comprises:

an access station; and container handing vehicles configured to move on the rail system;

wherein the framework structure comprises an access station compartment and outer panels of the upright members, and wherein the access station is insertable into and retrievable out from the access station compartment via a side opening in one of the panels;

wherein the access station comprises:

an access module comprising a frame, the frame defining a drawer compartment provided within the frame, and wheels secured to the frame for rolling the access station into and out from the access station compartment via the side opening;

a drawer comprising a drawer base and a drawer front, wherein the drawer is movably connected to the frame;

a first actuator for moving the drawer relative to the frame between a presentation position in which the drawer is protruding from the drawer compartment and a retracted position in which the drawer is retracted within the drawer compartment;

wherein the drawer is protruding from the access station compartment in the presentation position and wherein the drawer is retracted within the access station compartment in the retracted position;

wherein the access module is one single independent access module with a self-supporting frame provided with wheels;

wherein the one single independent access module with the self-supporting frame is insertable into and retrievable out from the access station compartment; and a conveyor module for transporting one of the storage containers between a main module and one of the columns, wherein the conveyor module is insertable into and retrievable out from the access station compartment.

2. An automated storage and retrieval system according claim 1, wherein the access station compartment has a width being larger than a distance between two of the upright members, wherein the width is measured in a direction coinciding with or in a direction parallel with the distance.

3. An automated storage and retrieval system according to claim 1, wherein the framework structure comprises a receptacle frame defining the access station compartment, wherein the receptacle frame forms a support for a plurality of the upright members.

4. An automated storage and retrieval system according to claim 3, wherein the receptacle frame comprises upright frame members and cross-members connected between the upright frame members.

5. An automated storage and retrieval system according to claim 1, wherein the framework structure comprises a support plate situated within the access station compartment and secured between a plurality of the upright members, wherein the wheels of the access station are supported on the support plate when inserted into the access station compartment.

6. An automated storage and retrieval system according to claim 1, wherein the access station comprises:

the main module secured to the outside of the framework structure, wherein the main module is configured to receive one of the storage containers;

a cover module for controlling access to one of the storage containers when received by the main module; and a conveyor module for transporting the storage container between the main module and one of the columns, wherein the conveyor module is insertable into and retrievable out from the access station compartment.

7. An automated storage and retrieval system according to claim 1, wherein the access station comprises a top opening alignable below one of the columns when the access station is inserted into the access station compartment, wherein at least one of the container handling vehicles is configured to supply a storage container to the access station through one of the columns and/or to retrieve a storage container from the access station through one of the columns when the access station is inserted into the access station compartment and aligned with one of the columns.

8. An automated storage and retrieval system according to claim 1, wherein the framework structure comprises horizontal members connected between the upright members at a height that permits the access station to be inserted into the access station compartment underneath the horizontal members.

9. An automated storage and retrieval system according to claim 1, wherein the access station comprises a front opening through which the drawer moves between the presentation position and the retracted position, wherein the front opening is alignable with a side opening of the access station compartment in the framework structure.

10. Method for installation and/or de-installation of an access station in an automated storage and retrieval system, wherein the method comprises:

inserting the access station into an access station compartment of a framework structure and/or retrieving the access station out from the access station compartment of the framework structure, wherein the framework structure comprises upright members and outer panels of the upright members and wherein the access station is insertable into and retrievable out from the access station compartment via a side opening in one of the panels, a storage volume comprising columns provided between the upright members, wherein storage containers are stackable in stacks within the columns, and a rail system provided on top of the upright members, wherein the automated storage and retrieval system comprises an access station, and container handing vehicles configured to move on the rail system, wherein the framework structure comprises an access station compartment, wherein the access station comprises an access module comprising a frame, the frame defining a drawer compartment provided within the frame, wheels secured to the frame for rolling the access station into and out from the access station compartment via the side opening, a drawer comprising a drawer base and a drawer front wherein the drawer is movably connected to the frame, a first actuator for moving the drawer relative to the frame between a presentation position in which the drawer is protruding from the drawer compartment and a retracted position in which the drawer is retracted within the drawer compartment wherein the drawer is protruding from the access station compartment in the presentation position and wherein the drawer is retracted within the access station compartment in the retracted position, wherein the access module is one single independent access module with a self-supporting frame provided with wheels, wherein the one single independent access module with the self-supporting frame is insertable into and retrievable out from the access station compartment, and a conveyor module for transporting one of the storage containers between a main module and one of the columns, wherein the conveyor module is insertable into and retrievable out from the access station compartment.

* * * * *